(12) United States Patent
Nakamura et al.

(10) Patent No.: US 8,092,777 B2
(45) Date of Patent: Jan. 10, 2012

(54) PROCESS FOR PRODUCING ANISOTROPIC MAGNETIC MATERIAL AND ANISOTROPIC MAGNETIC MATERIAL

(75) Inventors: Naoki Nakamura, Shizuoka-ken (JP); Tetsuo Uchikoshi, Tsukuba (JP); Yoshio Sakka, Tsukuba (JP)

(73) Assignees: Toyota Jidosha Kabushiki Kaisha, Toyota-Shi (JP); National Institute for Materials Science, Tsukuba-Shi (JP)

( * ) Notice: Subject to any disclaimer, the term of this patent is extended or adjusted under 35 U.S.C. 154(b) by 113 days.

(21) Appl. No.: 12/365,401

(22) Filed: Feb. 4, 2009

(65) Prior Publication Data

US 2009/0196820 A1 Aug. 6, 2009

(30) Foreign Application Priority Data

Feb. 4, 2008 (JP) ................................. 2008-024123

(51) Int. Cl.
*C01G 49/00* (2006.01)
(52) U.S. Cl. ........ 423/632; 423/633; 423/634; 423/151; 423/594.19; 264/108; 264/427; 264/428; 264/435; 264/437; 264/611; 264/658
(58) Field of Classification Search .................. 264/108, 264/427, 428, 435, 437, 611, 658, DIG. 58; 423/632–634, 151, 594.19; 252/62.51 R, 252/62.56, 62.61
See application file for complete search history.

(56) References Cited

U.S. PATENT DOCUMENTS

| | | | | |
|---|---|---|---|---|
| 2,766,888 A | * | 10/1956 | Queneau | 209/219 |
| 3,046,158 A | * | 7/1962 | Fukuda et al. | 427/128 |
| 3,337,328 A | * | 8/1967 | Lawver | 75/10.67 |
| 3,794,519 A | * | 2/1974 | Akahi et al. | 427/128 |
| 5,569,445 A | * | 10/1996 | Fukatsu et al. | 423/633 |
| 2005/0098761 A1 | * | 5/2005 | Takami et al. | 252/62.63 |

FOREIGN PATENT DOCUMENTS

| | | |
|---|---|---|
| JP | 57-92592 | 6/1982 |
| JP | 07-66027 | 3/1995 |
| JP | 10-144513 A | 5/1998 |
| JP | 2002193672 | 7/2002 |
| JP | 2004131363 | 4/2004 |
| JP | 2004134040 | 4/2004 |

OTHER PUBLICATIONS

Cigdem Cirpar, "Heat treatment of iron ore agglomerates with microwave energy" Thesis to graduate school of Natural and Applied Sciences of Middle East Technical Univ., Jan. 2005, pp. 52-68.*
T. Misawa, "Research Status and Unsolved Problems in Rusting of Iron and Steels," Bousyoku Gijutsu, vol. 32, pp. 657-667, 1983.
Japanese Office Action issued Jan. 20, 2010 with English translation; 5 pages (total).

* cited by examiner

*Primary Examiner* — Steven Bos
(74) *Attorney, Agent, or Firm* — Gifford, Krass, Sprinkle, Anderson & Citkowski, P.C.

(57) ABSTRACT

A process for producing an anisotropic magnetic material includes: preparing a feebly magnetic material capable of transforming into a magnetic material by a prescribed reaction, orienting the feebly magnetic material by imparting an external field to the feebly magnetic material, and transforming the oriented feebly magnetic material to a magnetic substance by the prescribed reaction.

18 Claims, 22 Drawing Sheets

TEM MICROGRAPH OF GOETHITE PARTICLES

MOLDED ARTICLE SOLIDIFIED IN MAGNETIC FIELD
(COMPARISON OF MAGNETIC FIELD STRENGTH)

900 °C

1200 °C

ORIENTED FIRED MOLDED ARTICLE

XRD OF GOETHITE MOLDED ARTICLES SLIP CAST IN MAGNETIC FIELD
(SMALL AMOUNT OF ORIENTATION OBSERVED
BASED ON COMPARISON WITH XRD OF FIG. 9)

XRD OF GOETHITE PARTICLES

XRD OF RESULTING ORIENTED HEMATITE MOLDED ARTICLE
(AFTER SINTERING AT 900°C)
(ORIENTED BY SLIP CASTING IN MAGNETIC FIELD)

XRD OF RESULTING ORIENTED HEMATITE MOLDED ARTICLE
(AFTER SINTERING AT 900°C)
(ORIENTATION NOT OBSERVED SINCE
MOLDED IN ABSENCE OF MAGNETIC FIELD)

XRD OF RESULTING ORIENTED HEMATITE MOLDED ARTICLE
(AFTER SINTERING AT 1100°C)
(DEGREE OF ORIENTATION HIGHER WHEN SINTERED AT 1100°C
THAN AT 900°C BASED ON COMPARISON WITH FIG. 10)

XRD OF RESULTING ORITNED HEMATITE MOLDED ARTICLE
(AFTER SINTERING AT 1200°C)
(DEGREE OF ORIENTATION HIGHER WHEN SINTERED
AT 1200°C THAN AT 1100°C BASED ON COMPARISON WITH FIG. 12)

F I G. 15A
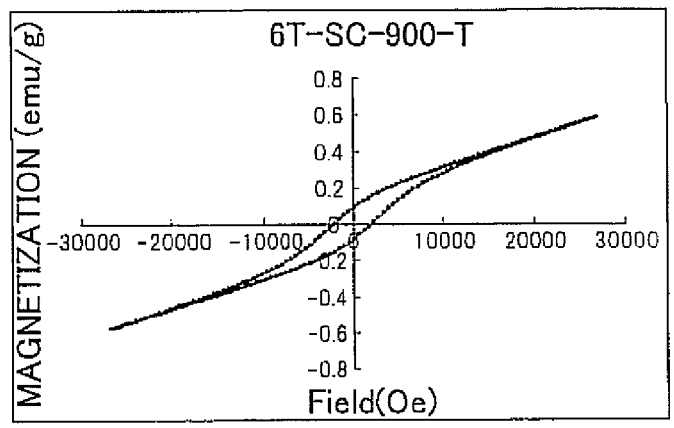
F I G. 15B
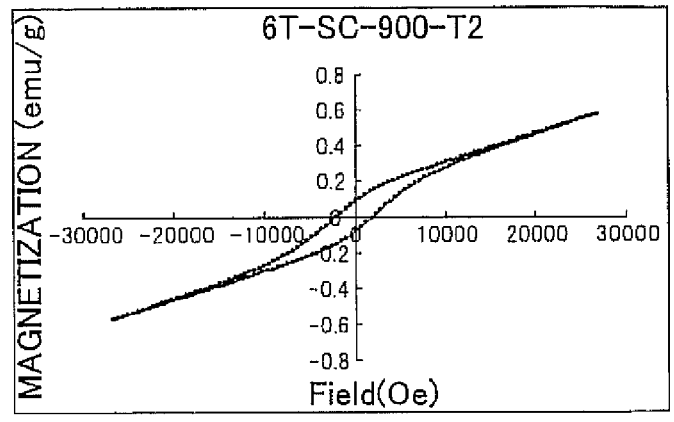
F I G. 15C
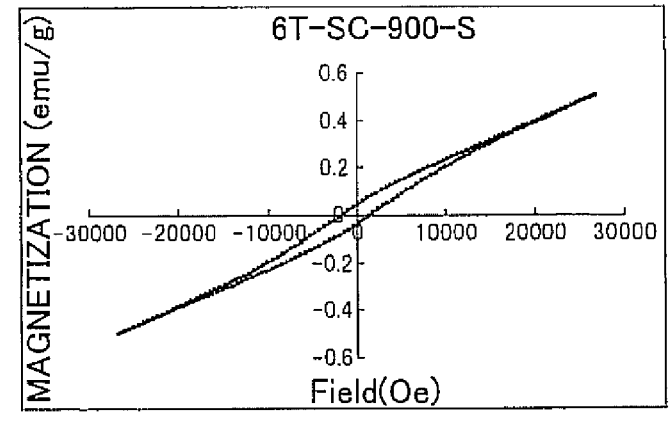
MAGNETIC CHARACTERISTICS OF
RESULTING ORIENTED HEMATITE
MOLDED ARTICLE (SINTERING AT 900°C AFTER
ORIENTING IN MAGNETIC FIELD AT 6 T)

MAGNETIC CHARACTERISTICS OF RESULTING ORIENTED HEMATITE MOLDED ARTICLE (SINTERING AT 1100°C AFTER ORIENTING IN MAGNETIC FIELD AT 6 T)

F I G. 17A
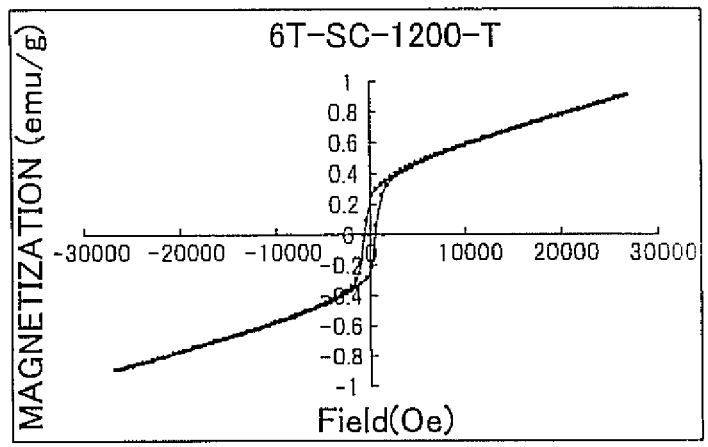
F I G. 17B
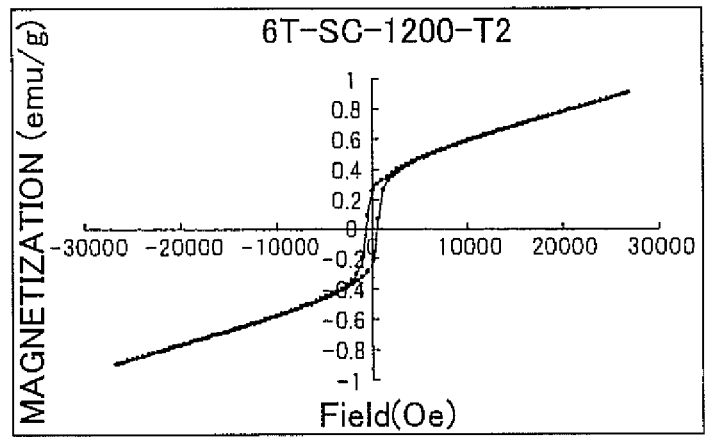
F I G. 17C
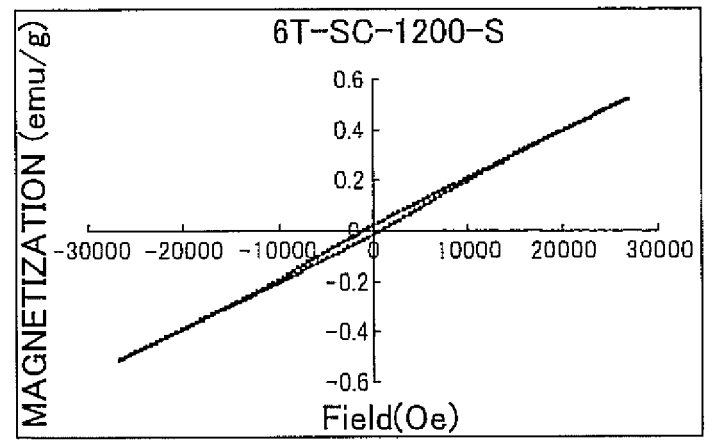
MAGNETIC CHARACTERISTICS OF RESULTING ORIENTED HEMATITE MOLDED ARTICLE (SINTERING AT 1200°C AFTER ORIENTING IN MAGNETIC FIELD AT 6 T)

MAGNETIC CHARACTERISTICS OF RESULTING ORIENTED HEMATITE MOLDED ARTICLE (SINTERING AT 900°C AFTER ORIENTING IN MAGNETIC FIELD AT 2 T)

MAGNETIC CHARACTERISTICS OF
RESULTING ORIENTED HEMATITE MOLDED
ARTICLE (SINTERING AT 1100°C AFTER
ORIENTING IN MAGNETIC FIELD AT 2 T)

MAGNETIC CHARACTERISTICS OF
RESULTING ORIENTED HEMATITE
MOLDED ARTICLE (SINTERING AT 1100°C IN
ABSENCE OF ORIENTING MAGNETIC FIELD)

MAGNETIC CHARACTERISTICS OF RESULTING
ORIENTED HEMATITE MOLDED ARTICLE
(SINTERING AT 1200°C AFTER
ORIENTING IN MAGNETIC FIELD AT 2 T)

F I G. 22A
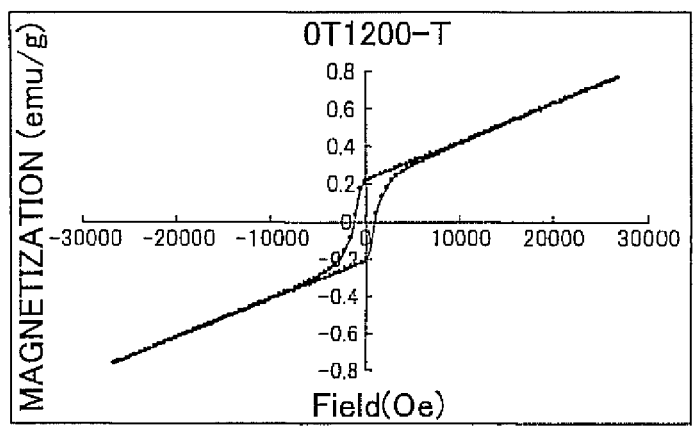
F I G. 22B
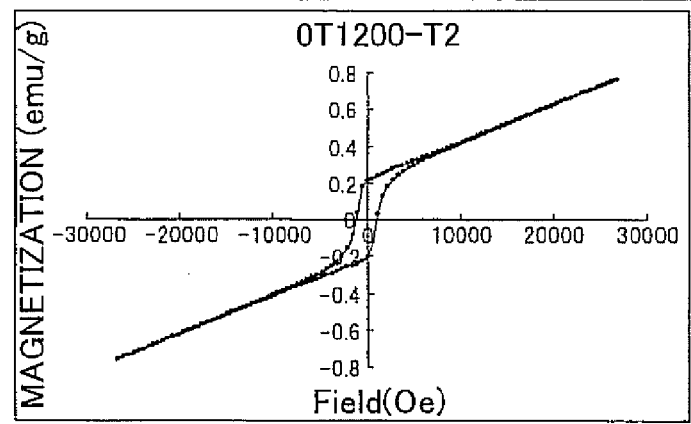
F I G. 22C
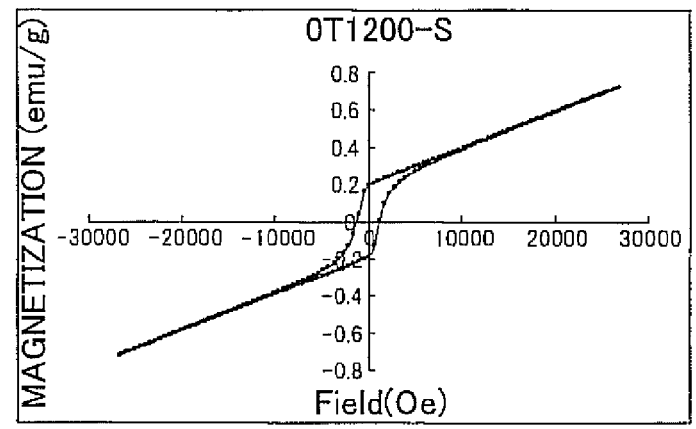
MAGNETIC CHARACTERISTICS OF RESULTING
ORIENTED HEMATITE MOLDED
ARTICLE (SINTERING AT 1200°C IN ABSENCE
OF ORIENTING MAGNETIC FIELD)

T SURFACE

S SURFACE

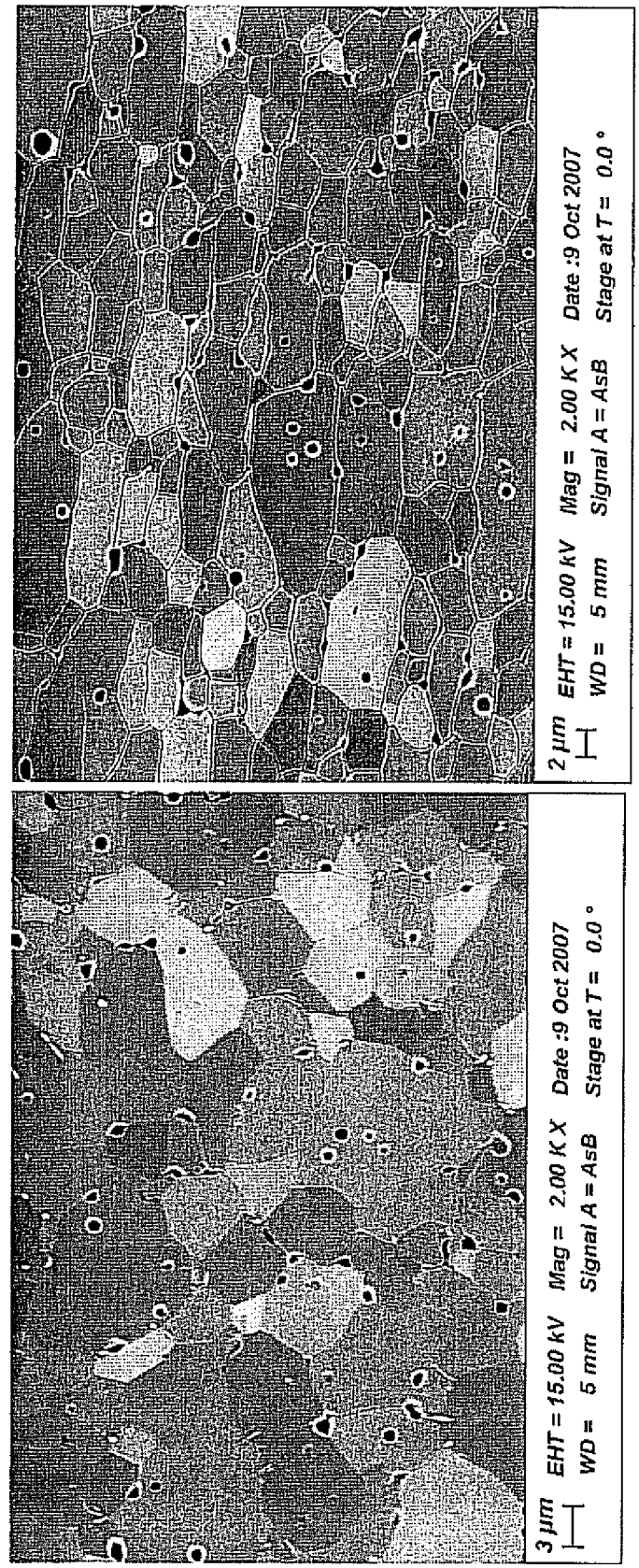
FIG. 24A / FIG. 24B
SEM MICROGRAPHS (ORIENTED HEMATITE)
T SURFACE / S SURFACE

PROCESS FOR PRODUCING ANISOTROPIC MAGNETIC MATERIAL AND ANISOTROPIC MAGNETIC MATERIAL

INCORPORATION BY REFERENCE

The disclosure of Japanese Patent Application No. 2008-024123 filed on Feb. 4, 2008, including the specification, drawings and abstract, is incorporated herein by reference in its entirety.

BACKGROUND OF THE INVENTION

1. Field of the Invention

The invention relates to a novel process for producing an anisotropic magnetic material and an anisotropic magnetic material, and more particularly, to a process for producing an anisotropic magnetic material allowing the obtaining of an oriented magnetic bulk by combining an orientation step, in which an external field is imparted to a feebly magnetic material by using the feebly magnetic material as a starting material, and a reaction step, in which a material in an oriented state is transformed into a magnetic substance, and to an anisotropic magnetic material.

2. Description of the Related Art

In the related art, anisotropic magnets are produced by crushing and pulverizing ingots obtained by melting and casting a magnetic material in the form of a magnet raw material, molding the resulting fine particles in a magnetic field, and then sintering. In this case, since orientation is carried out in the solid phase, the degree of freedom in orientation of the fine particles is low and adequate orientation is impossible. In addition, since pulverization is carried out by crushing, it is difficult to obtain nanoparticles yielding nanocomposite magnets having a small particle size for use as high-performance magnets from the resulting fine particles. In addition, since a crushing step is required, there is a high likelihood of contamination by impurities due to mechanical contact. Moreover, in the case of oxygen-free magnets in the manner of $Nd_2Fe_{14}B$-based magnets, which are conventional as high-performance magnets, it is necessary to remove oxygen and other impurities introduced by oxidation and the like in the production process. On the other hand, in the case of bond magnets enabling control of orientation, heat resistance ends up decreasing considerably as a result of containing resin.

On the other hand, a process for producing a magnetic tape that forms a film in a magnetic field is a conventional technology for controlling orientation of magnetic materials. In this technology, the magnetic field is oriented after having coated magnetic fine particles onto a base film, and the resulting anisotropic magnetic material is limited to thin films having a film thickness on the micron order, thereby making it difficult to obtain bulk materials with this technology. In other words, bulk forms of magnetic materials obtained by forming magnetic fine particles into a film as described above cannot be used in applications other than magnetic tape, such as magnetic heads, high-frequency transformers or motors.

In addition to this orientation control technology using coating of magnetic fine particles and magnetic field orientation, an improved technology for improving orientation of nanoparticles in magnetic tape has been proposed (Japanese Patent Application Publication No. 2004-134040 (JP-A-2004-134040)).

In addition, iron oxide is a conventional example of a magnetic material for bulk materials containing oxygen ("Corrosion Preventive Technology", Vol. 32, pp. 657-667, 1983), while soft ferrite is a typical example of a soft magnetic material, with MnZn ferrite represented by the formula $MFe_2O_4$ (M: Mn or Zn) being used in applications requiring high specific magnetic susceptibility and low coercive force (Hc), and Permalloy (78.5 Ni+Fe) or Supermalloy (5 Mo+79 Ni+Fe) and the like being used in applications requiring high magnetic permeability. Bulk materials in which orientation has been controlled are not conventional for this iron oxides and ferrite. In addition, these metals other than Fe, such as Mn, Zn, Mo and Ni, are elements having comparatively low Clarke numbers, which are used to quantify the level of mineral availability (for example, the Clarke numbers of these elements consist of 4.70 for Fe, 0.09 for Mn, 0.004 for Zn, 0.0013 for Mo and 0.01 for Ni).

On the other hand, a technology has been developed in recent years for producing bulk materials by controlling the orientation of feebly magnetic ceramic particles in an external field such as a magnetic field. For example, the related art disclosed in Japanese Patent Application Publication No. 2002-193672 (JP-A-2002-193672) is proposed as a slip cast molding technology in a magnetic field, while the related art disclosed in Japanese Patent Application Publication No. 2004-131363 (JP-A-2004-131363) is proposed as a magnetic field orientation electrophoresis deposition technology.

According to the improved technology described in JP-A-2004-134040, a nanoparticle magnetic recording medium is obtained in which L10-FePtCu or L10-FePt crystal grains are completely oriented along the c axis in a low melting point metal oxide or low melting point metal matrix by heat treatment and magnetic field orientation. However, the nanoparticles specifically described here are in the form of a thin film formed by sputtering, and the obtaining of a bulk material is impossible with this improved technology as well.

JP-A-2002-193672 describes an oriented ceramic sintered body and a production process thereof for sintering a molded article by dispersing a non-ferromagnetic powder having a non-isometric crystal structure in a slurry and then molding the slurry in a magnetic field. In addition, JP-A-2004-131363 describes a process for producing a ceramic high-order structure in which single crystal particles are oriented obtained by applying a strong magnetic field to a suspension of ceramic single crystal particles charged and dispersed in a solvent, orienting the individual particles by utilizing the crystal magnetic anisotropy thereof, applying an electric field to the suspension while in that oriented state and depositing the charged and oriented ceramic particles to obtain a ceramic structure in which the orientation and layer thickness of single crystal particles are highly controlled. According to these molding technologies, a bulk material in which crystallites are oriented in a fixed direction is obtained as a specific example thereof.

In this manner, a bulk structure in which magnetic particles are highly oriented in a fixed direction, or a production process thereof, are not yet conventional. Consequently, in order to form a bulk material from magnetic nanoparticles by applying orientation control technology for yielding a bulk material of ceramic particles to the magnetic nanoparticles, although it may be possible to consider orienting magnetic nanoparticles in the form of a slurry in a magnetic field as described in the related art, when the orientation of magnetic nanoparticles is attempted to be controlled in a magnetic field, magnetic interaction between the magnetic nanoparticles in the magnetic field increases, thereby making the magnetic nanoparticles susceptible to aggregation and making it difficult to obtain a bulk material in which orientation is controlled.

In other words, according to the related art, it has been difficult to obtain a bulk material in which the orientation of magnetic particles is controlled.

SUMMARY OF THE INVENTION

The invention provides a process for producing an anisotropic magnetic material that allows the obtaining of a bulk material in which the orientation of magnetic particles is controlled, and an anisotropic magnetic material having that property. In addition, the invention provides a process for producing an anisotropic magnetic material that allows the obtaining of a bulk material in which the orientation of magnetic particles is controlled by using an element having a high level of availability as a metal (element having a large Clarke number) or by lowering the amount used of a metal element having a low Clarke number.

In a first aspect thereof, the invention relates to a process for producing an anisotropic magnetic material, including: preparing a feebly magnetic material capable of transforming into a magnetic substance by a prescribed reaction; orienting the material by imparting an external field to the feebly magnetic material; and transforming the oriented feebly magnetic material to a magnetic material by the prescribed reaction.

In the production process as claimed in this aspect, the reaction that enables the oriented feebly magnetic material or the magnetic substance to be molded into a bulk molded article may be a topotactic reaction.

In the production process as claimed in this aspect, the feebly magnetic material may be $\alpha$-FeOOH, and the magnetic substance may be $\alpha$-Fe$_2$O$_3$.

In the production process as claimed in this aspect, the feebly magnetic material may be a diamagnetic substance or a paramagnetic substance, and the magnetic substance to which the feebly magnetic material transforms may be a ferromagnetic material.

In the production process as claimed in this aspect, the imparting of the external field may be the application of a magnetic field.

In the production process as claimed in this aspect, the strength of the magnetic field to be applied may be greater than or equal to 1 T and less than 10 T, may be greater than or equal to 1 T and less than 7 T, may be 1.5 T to 8 T, inclusive, or may be 1.5 T to 6.5 T, inclusive.

In the production process as claimed in this aspect, the direction in which the magnetic field is applied may be a direction parallel to gravity.

In the production process as claimed in this aspect, the prescribed reaction may be a dehydration reaction of the feebly magnetic material, the dehydration reaction may be a dehydration reaction carried out by heating the feebly magnetic material, and the temperature of the heated feebly magnetic material may be 250° C. or higher.

In the production process as claimed in this aspect, the temperature of the heated feebly magnetic material may be 900 to 1500° C., inclusive, or may be 1100 to 1200° C., inclusive.

In the production process as claimed in this aspect, the feebly magnetic material may be $\gamma$-FeOOH, and the magnetic substance may be $\gamma$-Fe$_2$O$_3$. In the production process as claimed in this aspect, the feebly magnetic material may also be Co(OH)$_3$.

According to the composition as described above, an anisotropic magnetic material can be obtained in the form of a bulk material in which the orientation of magnetic particles, such as oxygen-containing magnetic particles, is controlled. In addition, according to the invention, an anisotropic magnetic material, such as an oxygen-containing anisotropic magnetic material, can be obtained in the form of a bulk material in which the orientation of magnetic particles is controlled using only a metal having a large Clarke number as a metal component.

In a second aspect thereof, the invention relates to an anisotropic magnetic material produced by a process including: preparing a feebly magnetic material capable of transforming into a magnetic substance by a prescribed reaction; orienting the material by imparting an external field to the feebly magnetic material, and transforming the oriented feebly magnetic material to a magnetic substance by the prescribed reaction.

In a third aspect thereof, the invention relates to an anisotropic magnetic material having a magnetic substance in which magnetic particles have been bulked. In this anisotropic magnetic material, two of the three directions of the magnetic substance are isotropic while one direction is anisotropic, and the degree of anisotropy of the one direction is 1.2 or more.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 15 shows magnetic properties as determined by a vibrating sample magnetometer (VSM) of an oriented hematite sintered body of Example 1 sintered at 900° C. after molding at a magnetic field strength of 6 T;

FIG. 17 shows magnetic properties as determined by VSM of an oriented hematite sintered body of Example 3 sintered at 1200° C. after molding at a magnetic field strength of 6 T;

FIG. 22 shows magnetic properties as determined by VSM of a hematite sintered body of Comparative Example 3 sintered at 1200° C. after molding in the absence of a magnetic field;

FIG. 24 is an SEM micrograph of one example of an oriented hematite sintered body obtained in an example.

DETAILED DESCRIPTION OF EMBODIMENTS

In this example of the invention, a step for preparing a feebly magnetic material transformed to a magnetic substance by a prescribed reaction for use as a starting material, an orientation step for orienting a constituent material of the material by imparting an external field to the material, and a reaction step for transforming the material in the oriented state to a magnetic substance by a prescribed reaction are combined. Even if a topotactic (transformation) reaction is applied after having oriented by applying an external field to a starting material in the form of a material that is not transformed to a magnetic substance, or even if the starting material that is transformed to a magnetic substance, unless an external field is imparted to that material, it is difficult to obtain a magnetic material in the form of a finally oriented bulk structure.

Figure 1:
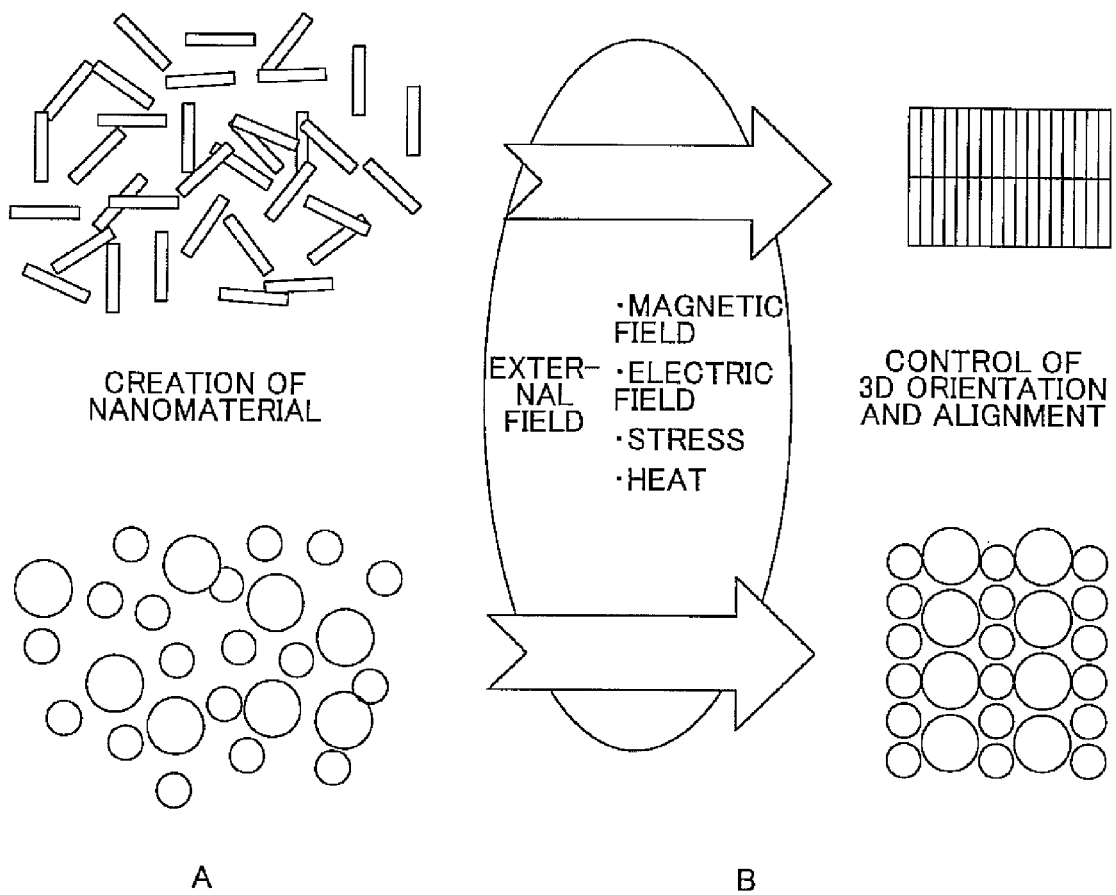
FIG. 1 is a model drawing of orientation-controlled bulking of a nanomaterial in Example 1 of the invention.

The following provides an explanation of an example of the invention using FIG. 1 in the form of a model drawing of bulking by orientation and alignment control of a nanomaterial of one embodiment of this invention. In FIG. 1, a bulk form of a feebly magnetic material in which orientation has been controlled is obtained by a step A, which is a step for preparing as a starting material a feebly magnetic material that is transformed to a magnetic substance by a prescribed reaction, and a step B, which is an orientation step for orienting a constituent material of the material by imparting an external field to the material.

In this example, as shown in step A of FIG. 1, a feebly magnetic material capable of being transformed to a magnetic substance by a prescribed reaction is first prepared as a starting material. Although not clearly shown in FIG. 1, the material is normally prepared by dispersing in a container. The magnetic substance and the feebly magnetic material may be contain a single metal or may contain two or more types of metals. Examples of substances used as a magnetic substance in the case of containing a single metal include iron oxides such as $Fe_2O_3$ or $Fe_3O_4$ and cobalt oxides such as $CoO$ or $CoO_2$, while examples of substances in the case of containing two or more types of metals include ferrites combining $MnO$, $ZnO$, $NiO$, $MgO$, $CuO$ or $Li_2O$ and the like with $Fe_2O_3$, spinel-type ferrites such as $NiO-MnO-ZnO-Fe_2O_3$, $MnO-ZnO-Fe_2O_3$ or $NiO-ZnO-Fe_2O_3$, garnet-type ferrite and spinel-type (cubic) $\gamma-Fe_2O_3$ or $\gamma-Fe_3O_4$. In particular, preferable examples include $\alpha-Fe_2O_3$, $Fe_3O_4$ and $\gamma-Fe_2O_3$, and particularly $\alpha-Fe_2O_3$. In addition, the magnetic material may have a single form or may consist of two or more forms.

Examples of the feebly magnetic material in the case the magnetic substance is iron oxide or cobalt oxide include $FeOOH$, $Fe(OH)_3$ and $Co(OH)_2$, with $FeOOH$ being preferable. In addition, in the case the magnetic substance is ferrite, examples of starting materials yielding metal oxides other than the iron component include hydroxides and hydroxycarbonates of these metals. The material is required to have crystal magnetic anisotropy in order to be able to be oriented by an external magnetic field. The form of the material may be an arbitrary form.

Figure 2:
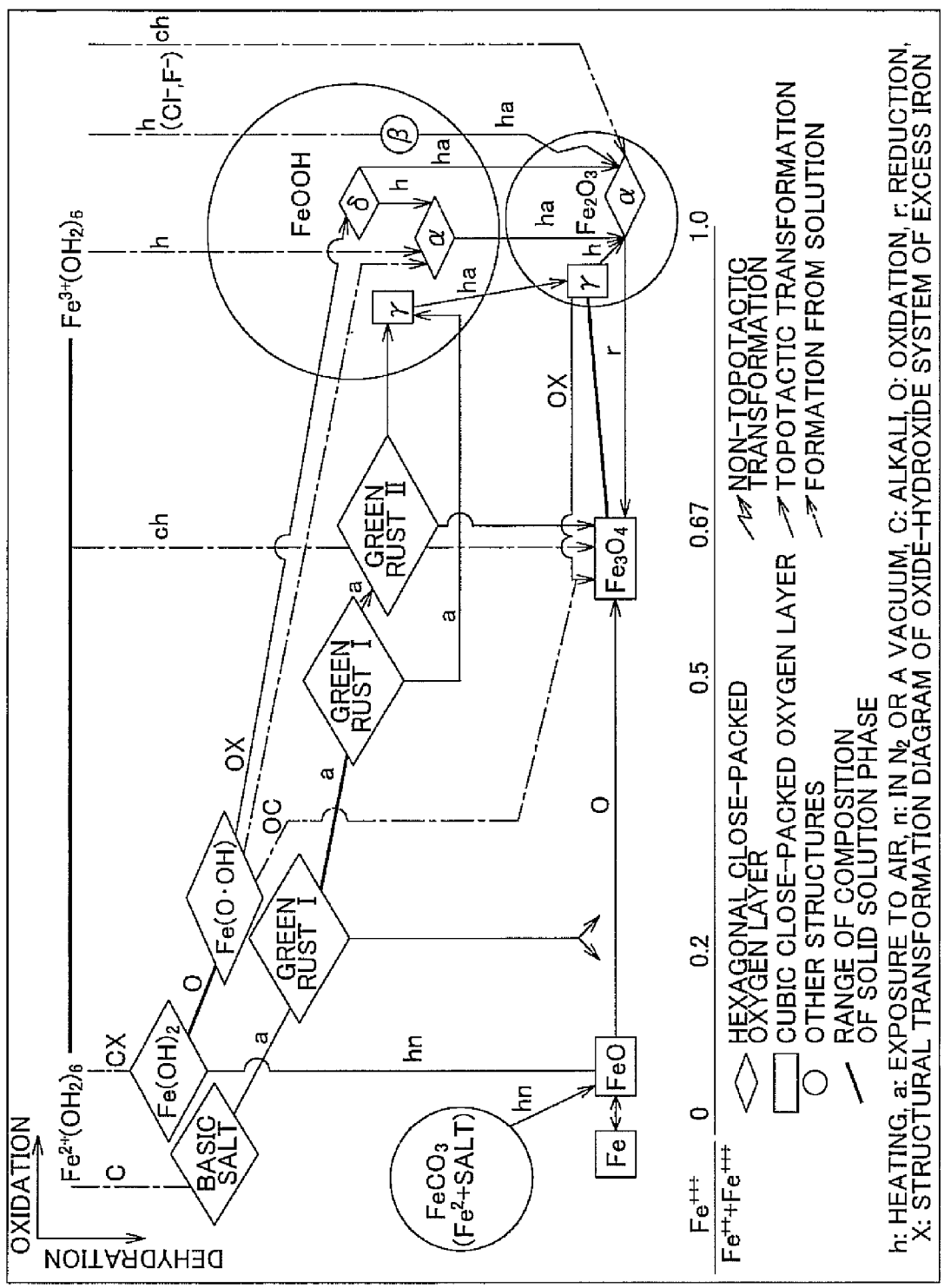
FIG. 2 is a structural transformation drawing of an oxidehydroxide system of iron as claimed in the related art.

As shown in FIG. 2, a structural transformation drawing of an iron oxide-hydroxide system as claimed in the related art is conventional. In the example, a feebly magnetic material in the form of goethite ($\alpha-FeOOH$) is used as a starting material, and a magnetic material in the form of hematite ($\alpha-Fe_2O_3$) can be obtained by a dehydration reaction as indicated by the following formula as shown in this transformation drawing.

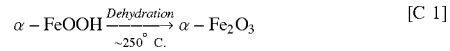

$$\alpha-FeOOH \xrightarrow[\sim 250° C.]{Dehydration} \alpha-Fe_2O_3 \qquad [C\ 1]$$

A ferromagnetic material in the form of $\gamma-Fe_2O_3$ can be obtained from the resulting $\alpha-Fe_2O_3$ by a subsequent reduction-oxidation step indicated by the following formula.

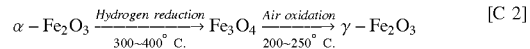

$$\alpha-Fe_2O_3 \xrightarrow[300\sim 400° C.]{Hydrogen\ reduction} Fe_3O_4 \xrightarrow[200\sim 250° C.]{Air\ oxidation} \gamma-Fe_2O_3 \qquad [C\ 2]$$

Preferable examples of this example include transformation from a starting material in the form of goethite ($\alpha$-FeOOH) to a feebly ferromagnetic material in the form of hematite ($\alpha$-$Fe_2O_3$), and transformation from a starting material in the form of lepidocrocite ($\gamma$-FeOOH) to a ferromagnetic material in the form of magnemite ($\gamma$-$Fe_2O_3$). In addition, a material that imparts a magnetic material containing a metal other than iron as described above may also be used as a starting material in the example.

In this example, it is necessary to combine an orientation step for orienting a constituent material of a material by imparting an external field to the material, and a reaction step for transforming the material in the oriented state to a magnetic substance by the reaction, and it is difficult to obtain an oriented magnetic bulk material by a step for transforming a material to a magnetic substance alone. Consequently, it is necessary to select conditions that allow the material to be easily rotated and oriented by an external magnetic field. In order to satisfy this requirement, a step for controlling orientation in a liquid phase can be provided with a solvent mixture in the form of a slurry in which a material in the form of nanoparticles is dispersed.

There are no particular limitations on the solvent of the solvent mixture provided it is a solvent that does not react with the particles, and an aqueous or non-aqueous solvent may be used. Normally, in consideration of the ease of preparing a stable slurry, water, methanol, ethanol, water/methanol mixture or water/ethanol mixture is used, with water being used preferably. Although there are no particular limitations on the ratio of the solid phase in the solvent mixture in which the material is dispersed provided it is within a range that allows the obtaining of a highly dispersed slurry, the ratio of the solid phase in the total amount of the solvent mixture is preferably about 5 to 50% by weight and particularly preferably about 10 to 50% by weight. In addition, a surfactant may also be contained in the solvent mixture slurry in which the material is dispersed to prevent aggregation between particles.

Numerous types of nonionic surfactants, cationic surfactants or anionic surfactants can be applied for the above-mentioned surfactant. A homogeneous slurry may be formed by a solvent mixture containing the material, solvent and surfactant.

Figure 3:
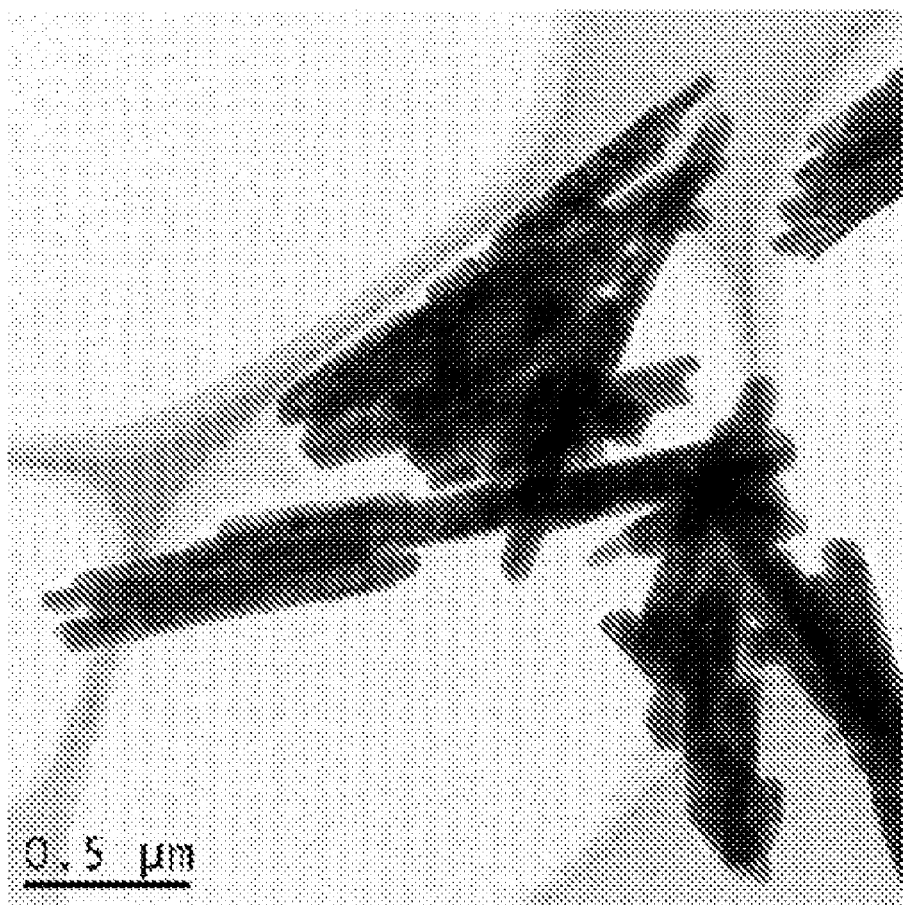
FIG. 3 is a transmission electron microscope (TEM) micrograph of goethite particles in Example 1 of the invention.
Figure 4A:
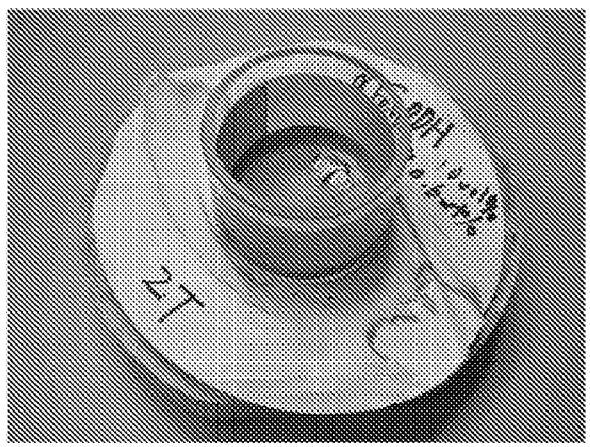
FIG. 4 is a photograph of a goethite molded article slip cast in a magnetic field in which the direction of the magnetic field is parallel to gravity in Example 1 of the invention.
Figure 4B:
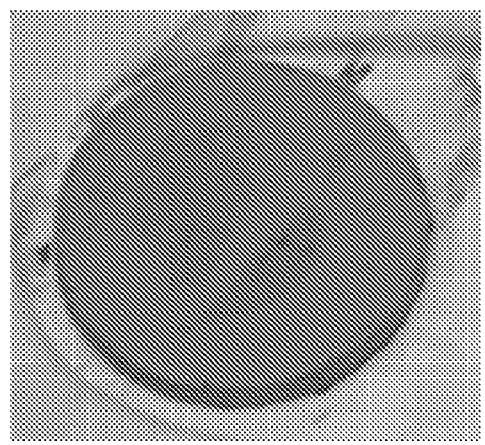

In this example, a constituent material of the material is oriented by imparting an external magnetic field to the material, and preferably to the material in the slurry, as shown in step B of FIG. 1. This orientation step is explained using the example of a goethite molded article slip cast in a magnetic field in which the direction in which the external magnetic field is applied is the direction of gravity (direction parallel to gravity) according to one embodiment of this step. FIG. 3 shows TEM micrograph of goethite particles used for the starting material, while in FIG. 4, the drawing on the left shows a goethite molded article in a container oriented by applying a magnetic field, and the drawing on the right shows a goethite molded article that has been removed from the container. As shown in FIG. 4, a thick-walled goethite molded article can be obtained according to the above-mentioned step of the invention.

As shown in FIG. 4, the material is prepared in a container. There are no particular limitations on the container provided it is formed from a substance not affected by an external magnetic field, examples of which include containers made of plastic, ceramics or glass.

In this example, it is necessary to orient a constituent material of the material by applying an external magnetic field to the material, and consequently, it is necessary to acquire the oriented material, oriented by applying an external magnetic field to the solvent mixture containing the material in a container, for example, in the form of an oriented molded article by deposition and bulking. Acquisition of a constituent material of the material in the form of an oriented molded article is preferably carried out by a method in which deposition and bulking are carried out simultaneous to orientation of the material while applying the external field, and an example of a method that satisfies this condition consists of carrying out slip casting while applying an external magnetic field simultaneous to deposition and bulking by, for example, electrophoresis.

In this example, in the case of carrying out orientation of the material while applying an external magnetic field simultaneous to deposition and bulking, a combination of a magnetic field, deposition and slip casting as a bulking means is both convenient and preferable. Consequently, it is preferable to obtain an oriented molded article of the material by using a container that allows separation of solvent, and achieving deposition and bulking of the material from a solvent mixture containing a material oriented by a magnetic field. Although the oriented molded article of the material has shape retention provided force is not applied from the outside, since it is a comparatively brittle bulk material, it can be easily cut with a knife or cutter and molded into a bulk molded article of a desired shape.

In this example, the solvent in the slurry in the form of a mixed solvent containing the material is absorbed by a container that allows separation of the solvent holding the slurry. If the absorption rate at this time is too high, the degree of orientation of non-magnetic material particles is decreased, while if the absorption rate is too low, solidification and molding time becomes excessively long, thereby making it preferable to adjust the pore diameter and pore density of the container so as to achieve a suitable absorption rate. Consequently, it is preferable to use a porous container such as a plaster or alumina porous body for the container. It is also preferable to suitably select and use a filter having a predetermined pore diameter together with using a porous container. In addition, a form can also be employed in which a filter is placed on a porous board followed by installing a glass or plastic cylindrical container thereon.

In addition, if the magnetic field strength of the magnetic field is too strong, magnetic interaction between the material particles or between the particles and the magnet imparting the magnetic field becomes excessively large, thereby making it difficult to obtain a homogeneous molded article, and thus making it difficult to mold into a bulk molded article. In addition, if the magnetic field strength is too weak, it is difficult to orient the material particles. The magnetic field strength may be constant or gradually increased during the time the magnetic field is applied. Preferable magnetic field conditions are conditions that enable the obtaining of a homogeneous molded article, and thus that enable molding into a bulk molded article. As a general reference for the magnetic field strength, the magnetic field strength may be greater than or equal to 1 T and less than 10 T, and in particular, 1.5 T to 8 T, inclusive. In addition, in the case of applying a magnetic field, although there are no particular limitations on the direction of the magnetic field and the magnetic field may be applied in any arbitrary direction, such as a direction opposite to the direction of gravity (direction perpendicular to the ground) or a direction perpendicular to the direction of gravity (direction parallel to the ground). The duration of application of the external magnetic field is generally 1 to 24 hours.

The driving force causing the material particles to rotate and orient when using a magnetic field for the external field (magnetization energy) is represented by the following formula: $\Delta E = \Delta \chi V B^2 / 2 \mu_0$, wherein $\Delta \chi$: anisotropy of magnetic susceptibility, V: volume, B: magnetic field strength and $\mu_0$: magnetic permeability in a vacuum, and applies to the case in which the orientation conditions for orienting the particles has the following relationship: $\Delta E > kT$, wherein kT: thermal vibration energy.

In this example of the invention, it is preferable to use a magnetic field for the external field, combine the use of slip casting for the deposition and bulking method, and use FeOOH particles for the material, and the strength of the magnetic field may be greater than or equal to 1 T (Tesla) and less than 7 T, and particularly, 1.5 to 6.5 T, inclusive.

Figure 5:
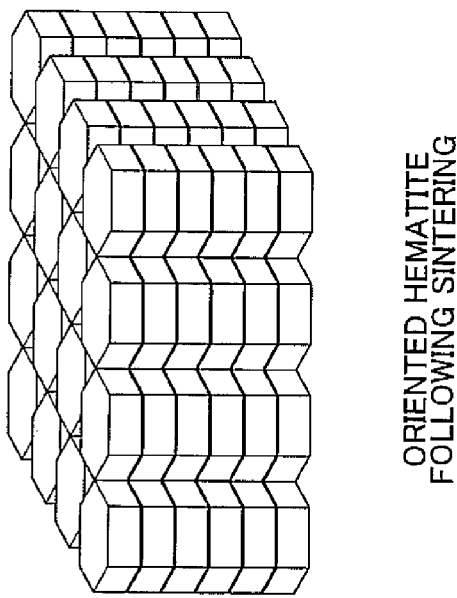
FIG. 5 is a model drawing showing a transformation from oriented goethite to oriented hematite in one embodiment of a reaction step for transforming a material to a magnetic substance.
Figure 5:
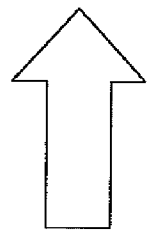
Figure 5:
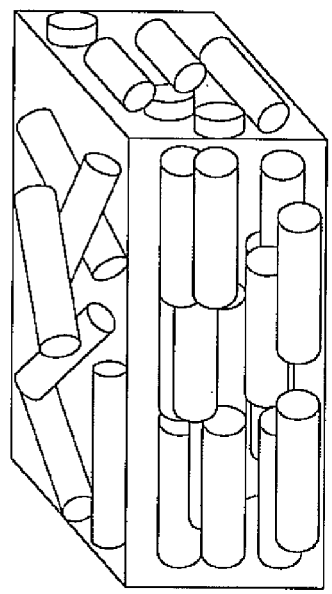

Next, in the invention, the material of the oriented molded article in an oriented state is transformed to a magnetic substance by a reaction. An explanation of the reaction step for transforming to a magnetic substance is explained using FIG. 5, which is a model drawing showing transformation from oriented goethite to oriented hematite in an embodiment of a reaction step for transforming the material to a magnetic substance. In the left drawing of FIG. 5, acicular goethite particles are positioned horizontally. On the other hand, in the right drawing of FIG. 5, hematite is in the form of sheets after sintering. Although the form of the particles is lost as shown in FIG. 5 as a result of transformation from the oriented goethite to the oriented hematite after sintering, anisotropy indicated by orientation of the particles is obtained.

An example of a reaction for causing transformation of a certain material in an oriented state to a magnetic substance is a dehydration reaction carried out by heating. In this example, the material to which a topotactic (transformation) reaction is applied is a material that yields a magnetic material following transformation and which has been oriented in advance.

The reaction for transforming the material to a magnetic substance in this example, such as a dehydration reaction carried out by heating, can be suitably selected according to the feebly magnetic material used, and in the case the material used for the starting substance is diamagnetic $\alpha$-FeOOH, for example, heating may be carried out at a temperature of 250 or higher, and particularly 300° C. or higher, preferably a temperature of 900 to 1500° C., inclusive, at which a sintered body is obtained, and particularly preferably a temperature of 1100 to 1200° C., inclusive, at which the degree of orientation is improved by particle growth. The dehydration reaction allows the obtaining of an orientation-controlled bulk molded article in the form of an anisotropic magnetic material by carrying out the reaction at a temperature and duration at which dehydration is completed in the presence of air in a container made of an arbitrary non-magnetic heat-resistant material such as alumina, either directly or after having molded in an arbitrary shape such as a sheet or cube by an arbitrary processing method such as cutting or laminating, on an oriented molded article composed of a feebly magnetic material in an oriented state. Alternatively, an orientation-controlled bulk molded article in the form of an anisotropic magnetic material can also be obtained by further molding the magnetic substance into an arbitrary shape by an arbitrary processing method following the above-mentioned reaction.

The anisotropic magnetic material obtained according to this example is a novel material, and allows the obtaining of a bulk structure having high mechanical strength in which the orientation of individual magnetic particles in the form of magnetic nanoparticles is controlled and in which orientation in each dimension (length, width and height) is controlled on the mm or cm order or more. According to this example, an orientation-controlled structure composed of an anisotropic magnetic material can be obtained in which an MH curve obtained by measuring with VSM, which indicates the magnetic characteristics of a structure, demonstrates anisotropy in the direction of the axis of easy magnetization and in the direction of the axis of hard magnetization.

As will be explained in detail in the forthcoming section on the examples, degree of anisotropy as indicated by the following formula is determined by comparing a curve in the direction of the axis of easy magnetization and a curve in the direction of the axis of hard magnetization in an MH curve used to indicate the magnetic characteristics of a molded article, and with respect to portions of openings surrounded by the curves excluding the substantially overlapping portions of each curve (diamond-shaped portion formed by, for example, the S-shaped curves of FIGS. 15 to 22), using a factor (anisotropy factor: AF) for which the difference between both openings for the slope of that opening [tan (angle) (A)] [(angle) A: angle formed with horizontal axis (magnetization=0 emu/g) of a straight line connecting both peaks of the opening] or the width (W) of that opening is large, and refers to the case of the degree of anisotropy as indicated with this value being 1.2 or more and particularly 1.5 or more. This degree of anisotropy is normally 10 or less. Degree of anisotropy=AD1/AD0. Here, AD1 represents the axis having the larger of the AF of the curve in the direction of the axis of easy magnetization and the AF of the curve in the direction of the axis of hard magnetization as determined by a comparison thereof, while AD0 represents the axis having the smaller of the AF of the curve in the direction of the axis of easy magnetization and the AF of the curve in the direction of the axis of hard magnetization as determined by a comparison thereof. The magnetic material of the invention is a magnetic substance in which magnetic particles have been bulked, two of the three directions of the magnetic substance is isotropic while one direction is anisotropic, and the degree of anisotropy is 1.2 or more and particularly 1.5 to 10, inclusive. In contrast, in a magnetic material to which an external field is not applied, the previously described AD1=AD0 and the degree of anisotropy is 1.

The anisotropic magnetic material of this example can be used directly in a magnetic head or high-frequency transformer and the like if it is a feebly magnetic substance, or can be used directly as a transformed ferromagnetic material by reducing with hydrogen or oxidizing in air if it is a ferromagnetic substance.

The following indicates examples of the invention. In each of the following examples, evaluation of the orientation state and magnetic characteristics of the materials were carried out in the manner described below. The structures of goethite molded articles and hematite sintered bodies were evaluated by (XRD for the top surface and side surface of the molded articles. The top indicates the surface perpendicular to the direction of gravity, and thus the surface parallel to the ground, while the side indicates the surface parallel to the direction of gravity. The MH curves of hematite sintered bodies were used to evaluate anisotropy by VSM measurement of the top and side surfaces of molded articles using for the apparatus a VSM measuring system manufactured by LakeShore Corp. (Vibrating Sample Magnetometer System). In addition, particles of a feebly magnetic material in the form of goethite were measured for the shape of the particles by TEM. A TEM micrograph of the goethite particles used in the examples is shown in FIG. 3.

The following provides an explanation of Example 1. The step for preparing a feebly magnetic material for the starting material consisted of respectively weighing out 16 g of goethite manufactured by Titan Kogyo, Ltd. (trade name: LEMON, shape: rods, mean length: 800 nm, aspect ratio: within the range of 1:5 to 1:10), 0.2 g of surfactant manufactured by Toagosei Co., Ltd. (trade name: Aron A6114) and 36 g of ion exchange water, followed by mixing and dispersing with an ultrasonic homogenizer to prepare a stable slurry.

Figure 8:
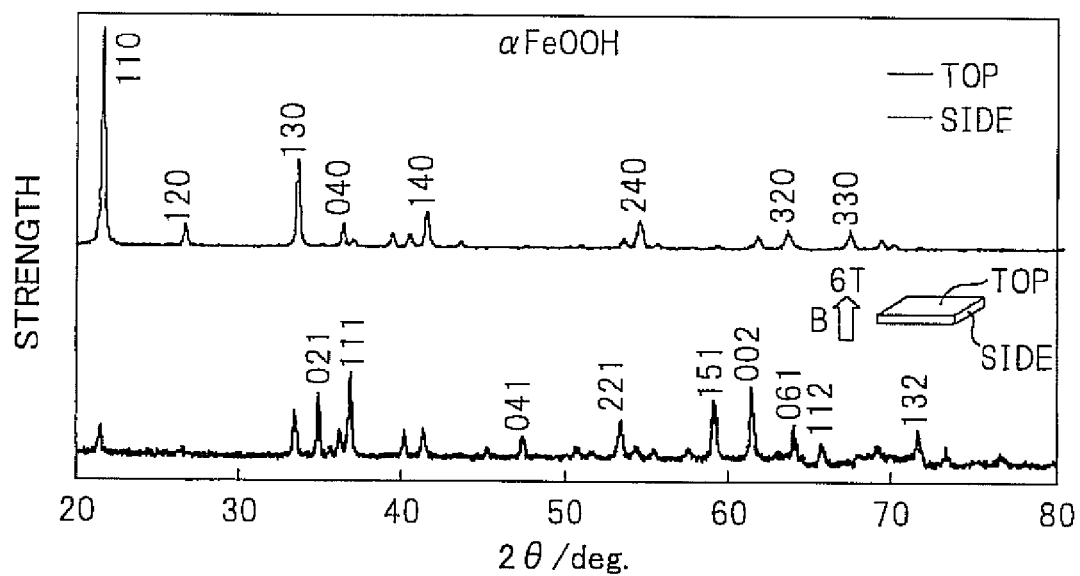
FIG. 8 is an X-ray diffraction (XRD) graph of an oriented goethite molded article of Example 1 slip cast in a magnetic field in an example of the invention.
Figure 9:
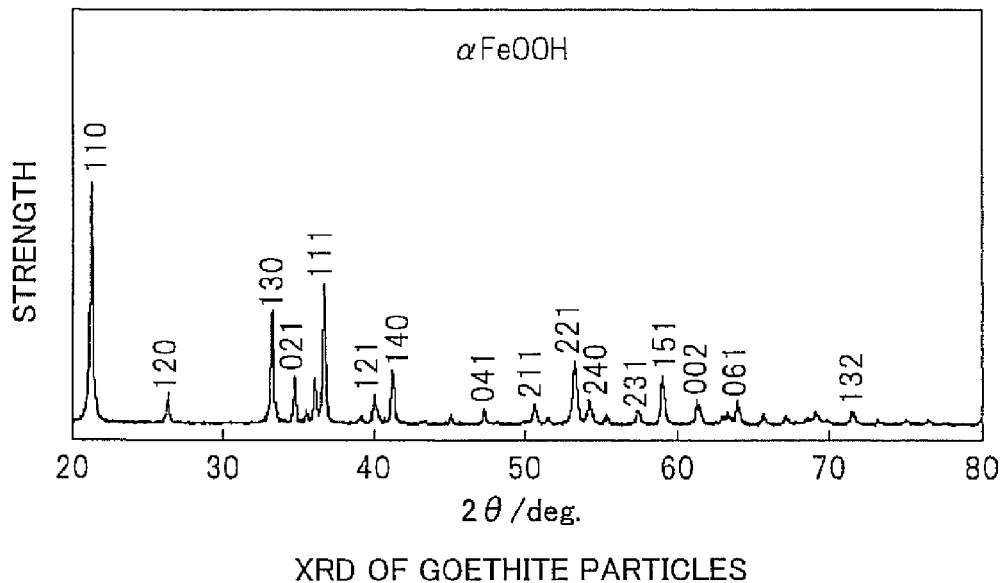
FIG. 9 is an XRD graph of a goethite powder used in an example.

The orientation step for orienting a constituent material of a feebly magnetic material consisted of placing a filter (membrane sheet) on an alumina porous body, installing a glass cylinder thereon, and pouring the slurry in which the goethite particles were dispersed into the cylinder. This was then installed in a superconducting magnet, and allowed to solidify by allowing to stand undisturbed overnight at room temperature (indicated by RT in the drawings) while applying a magnetic field at a magnetic field strength of 6 T in the direction of the magnetic field (B) from the bottom to the top of the cylinder to obtain an oriented goethite molded article. The XRD of this goethite oriented molded article is shown in FIG. 8. In addition, the XRD of the raw material goethite powder is shown in FIG. 9 for comparison. This molded article itself can be processed in an arbitrary shape by cutting, is brittle and crumbles easily when a strong force is applied thereto.

Figure 7A:
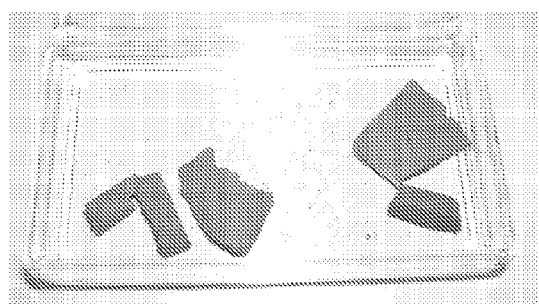
FIG. 7 is a photograph of two types of oriented hematite sintered bodies sintered at different sintering temperatures in an example of the invention.
Figure 7B:
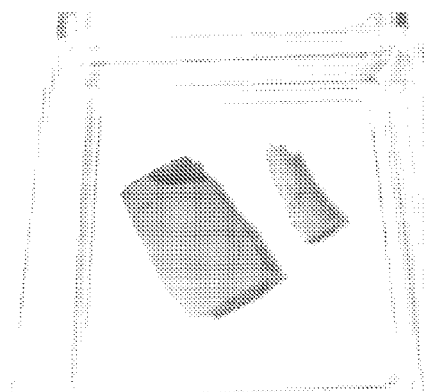

The reaction step for transforming to a magnetic material consisted of sintering the solidified oriented molded article obtained in the previous step in air. The sintering temperature was 900° C. and the sintering time was 2 hours. As a result of this heat treatment, the material underwent a structural change from goethite to hematite. The resulting hematite had a reddish-brown color. A photograph of this oriented hematite sintered body is shown in FIG. 7 along with a photograph of an oriented hematite sintered body obtained in Example 3 to be described later (the photograph on the left in FIG. 7 shows the oriented hematite sintered body of Example 1 obtained by sintering at 900° C., while the photograph on the right in FIG. 7 shows the oriented hematite sintered body of Example 3 obtained by sintering at 1200° C.).

Figure 10:
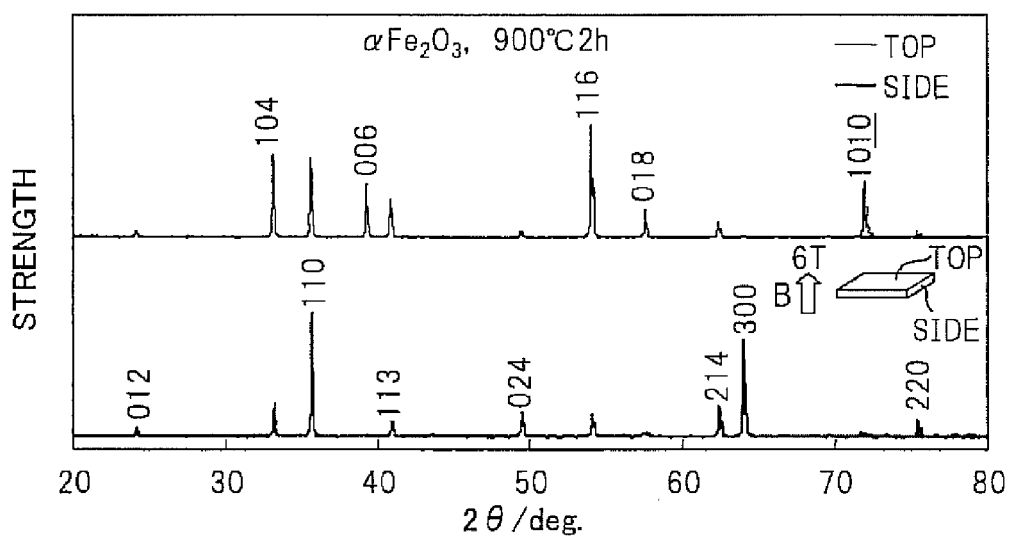
FIG. 10 is an XRD graph of an oriented hematite sintered body of Example 1 sintered at 900° C. after molding at a magnetic field strength of 6 T.

Evaluation of the oriented structure consisted of, for example for measuring with VSM, a cutting out a material for measurement of physical properties from the oriented hematite sintered body such as a cube having a final shape measuring 2 mm×2 mm×2 mm. The structure of the resulting oriented hematite sintered body (oriented structure) was evaluated by XRD, and the magnetic characteristics thereof were evaluated by VSM. Furthermore, the three directions of the MH curve as determined by VSM were as follows: T: direction in which the top surface is parallel to the direction of the magnetic field and the side surface is perpendicular to the direction of the magnetic field (direction of axis of easy magnetization); T2: direction in which the normal line of the top surface of the above sample is rotated 90° to the axis (direction of axis of easy magnetization); S: direction in which top surface is perpendicular to the direction of the magnetic field and the side surface is parallel to the direction of the magnetic field (direction of axis of hard magnetization). The results of XRD are shown in FIG. 10, while the results of VSM are shown in FIG. 15.

On the basis of FIG. 15, since the anisotropic factor (AF) differing from the other two shapes of the shapes of the openings is the width (W) of the opening, when the degree of anisotropy of magnetic characteristics as previously described is determined from the following formula, a value of about 1.5 results, and the result of visual observation of anisotropy in FIG. 15 was confirmed numerically as well. Degree of anisotropy=AF of curve in direction of axis of easy magnetization/AF of curve in direction of axis of hard magnetization=width (W) of opening in direction of axis of easy magnetization/width (W) of opening in direction of axis of hard magnetization=approx. 4.5 mm/approx. 3 mm=approx. 1.5.

Figure 11:
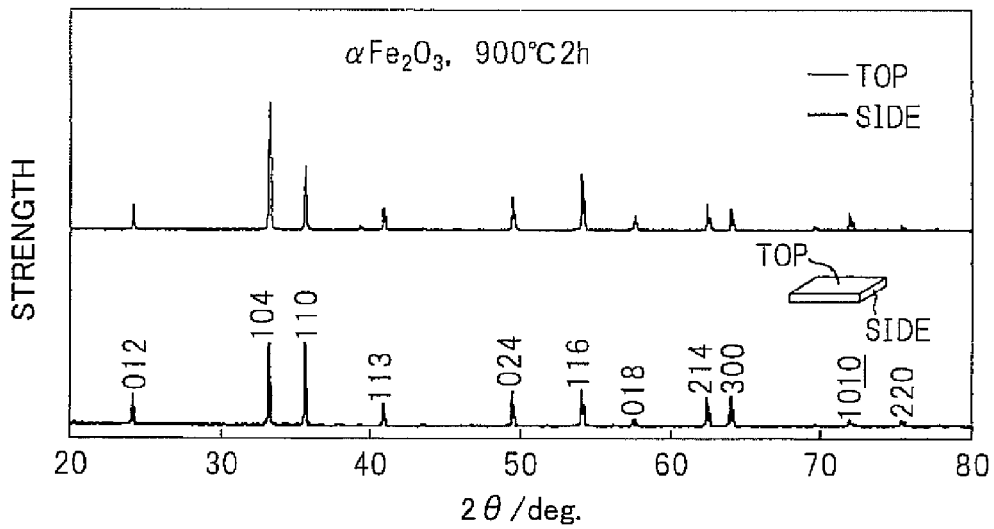
FIG. 11 is an XRD graph of a hematite sintered body of Comparative Example 1 sintered at 900° C. after molding in the absence of a magnetic field.

In Comparative Example 1, a magnetic field was not applied (indicated as 0 T in the drawings). The remainder of the procedure was carried out in the same manner as Example 1 to obtain a goethite molded article. A hematite sintered body was obtained by sintering for 2 hours at 900° C. in the same manner as Example 1 with the exception of using this goethite molded article. The results of XRD of the resulting goethite molded article are shown in FIG. 11. Since molding was not carried out in a magnetic field, orientation is not observed in the sintered body of FIG. 11.

Figure 12:
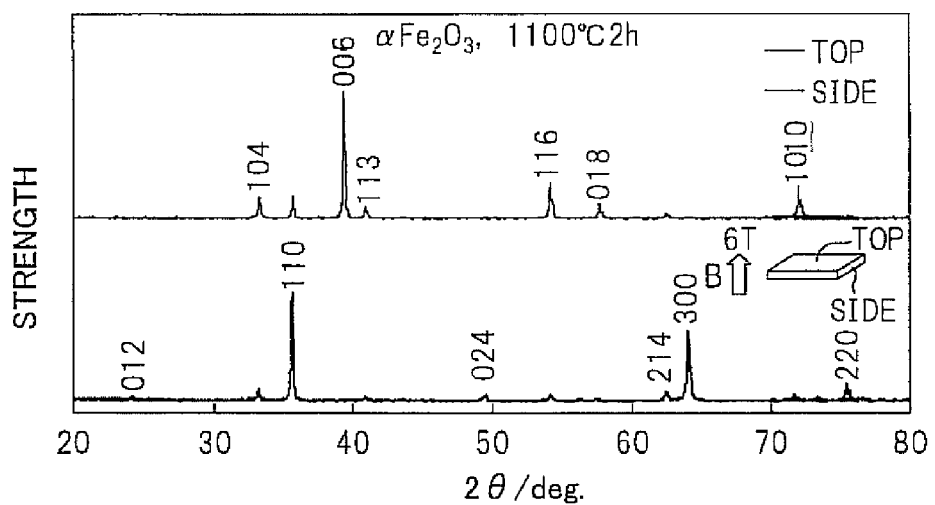
FIG. 12 is an XRD graph of an oriented hematite sintered body of Example 2 sintered at 1100° C. after molding at a magnetic field strength of 6 T.
Figure 16A:
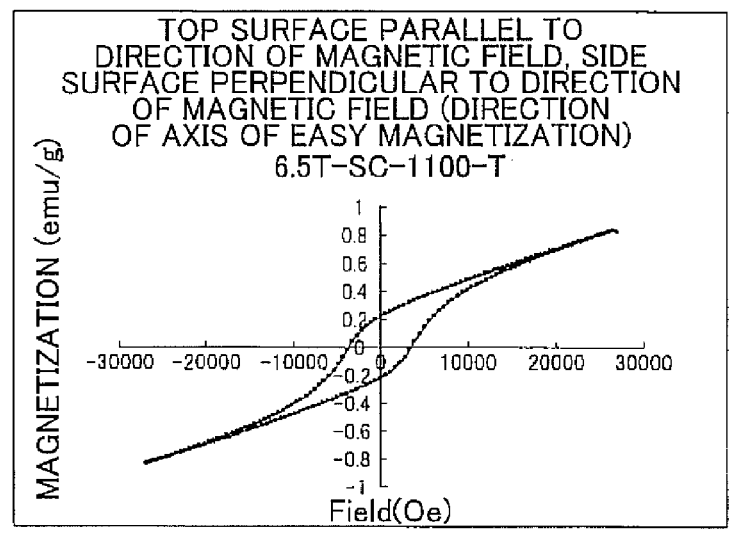
FIG. 16 shows magnetic properties as determined by VSM of an oriented hematite sintered body of Example 2 sintered at 1100° C. after molding at a magnetic field strength of 6 T.
Figure 16B:
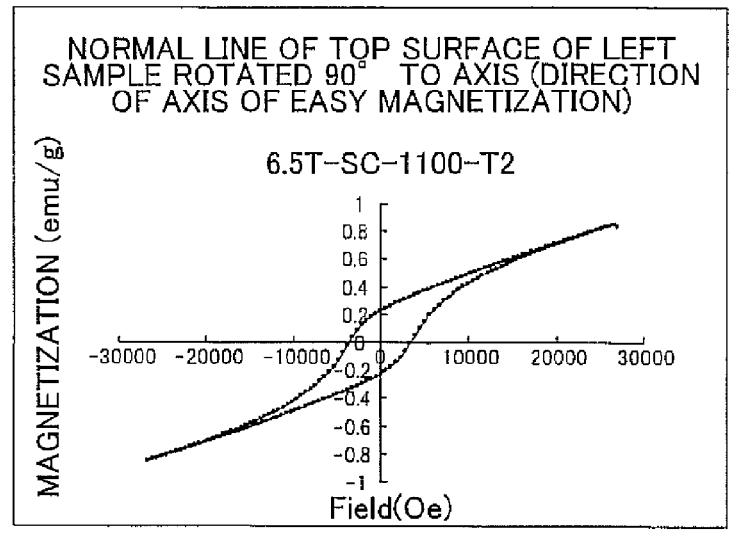
Figure 16C:
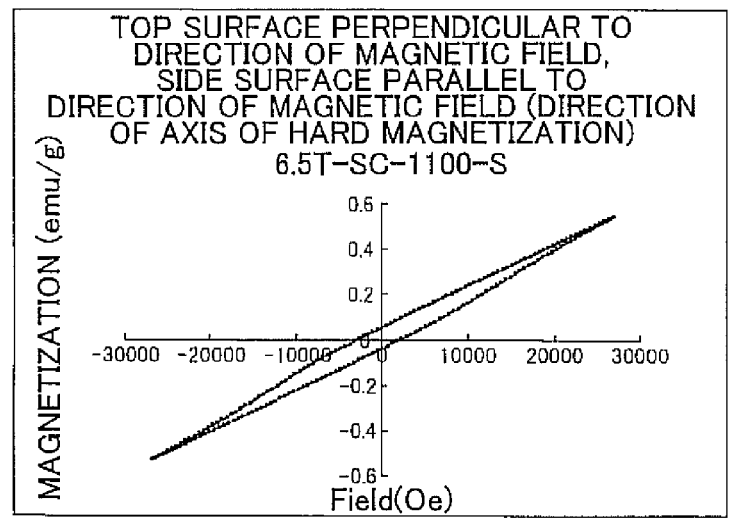

The following provides a description of Example 2. A hematite sintered body was obtained by carrying out the procedure in the same manner as Example 1 with the exception of changing the sintering temperature from 900 to 1100° C. The XRD and VSM of the structure of the resulting oriented hematite sintered body were measured. The results of XRD are shown in FIG. 12, while the results of VSM are shown in FIG. 16. On the basis of FIG. 16, since the anisotropic factor (AF) differing from the other two shapes of the shapes of the openings is the width (W) of the opening, when the degree of anisotropy of magnetic characteristics as previously described is determined from the following formula, a value of about 2.5 results, and the result of visual observation of anisotropy in FIG. 16 was confirmed numerically as well. Degree of anisotropy=width (W) of opening in direction of axis of easy magnetization/width (W) of opening in direction of axis of hard magnetization=approx. 10 mm/approx. 4 mm=approx. 2.5.

Figure 13:
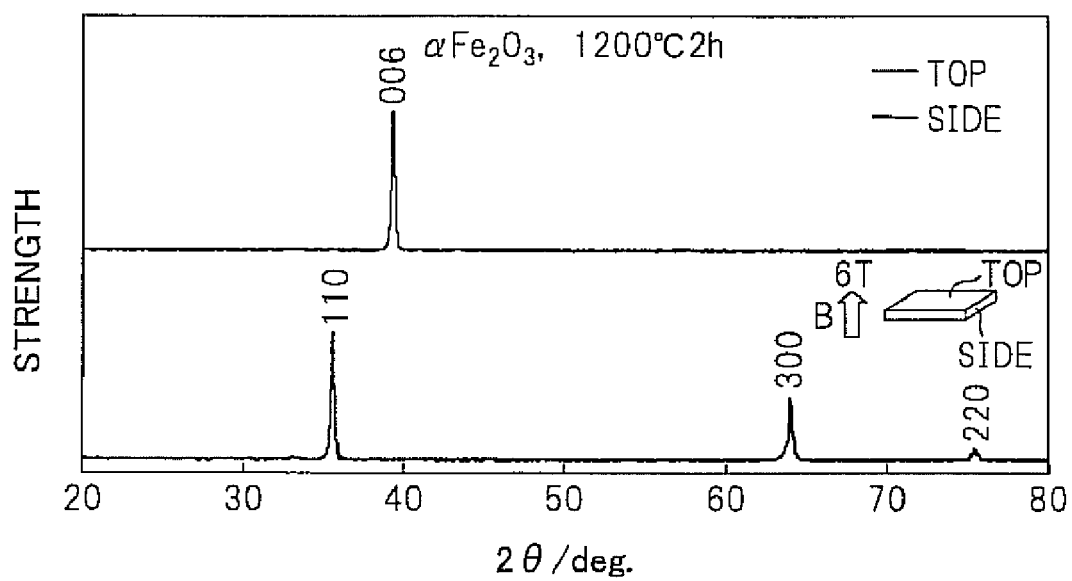
FIG. 13 is an XRD graph of an oriented hematite sintered body of Example 3 sintered at 1200° C. after molding at a magnetic field strength of 6 T.

The following provides a description of Example 3. An oriented hematite sintered body was obtained by carrying out the same procedure as Example 1 with the exception of changing the sintering temperature from 900 to 1200° C. The resulting hematite had a silver-black color. A photograph of the oriented hematite sintered body obtained by sintering at 1200° C. is shown in FIG. 7 along with a photograph of the hematite of Example 1 (the photograph on the right in FIG. 7 shows the oriented hematite sintered body of Example 3, while the photograph on the left shows the oriented hematite sintered body of Example 1). The XRD and VSM of the structure of the resulting oriented hematite sintered body were measured. The results of XRD are shown in FIG. 13, while the results of VSM are shown in FIG. 17. On the basis of FIG. 17, since the anisotropic factor (AF) differing from the other two shapes of the shapes of the openings is the tan [angle (A) of the opening], when the degree of anisotropy of the magnetic characteristics as previously described is determined from the following formula, a value of about 5.4 results, and the result of visual observation of anisotropy in FIG. 17 was confirmed numerically as well. Degree of anisotropy=tan [angle (A) of opening in direction of axis of easy magnetization]/tan [angle (A) of opening in direction of axis of hard magnetization]=tan approx. 72°/tan approx. 38°=approx. 5.4.

On the basis of observation of the drawings of the VSM of the oriented hematite of Examples 1 to 3 as described above (FIGS. 15 to 17), since the MH curve of VSM has the same shape for T and T2 and the direction of anisotropy is S, only T and S are measured in the following examples and the degree of anisotropy may be determined in the direction of S.

Figure 18A:
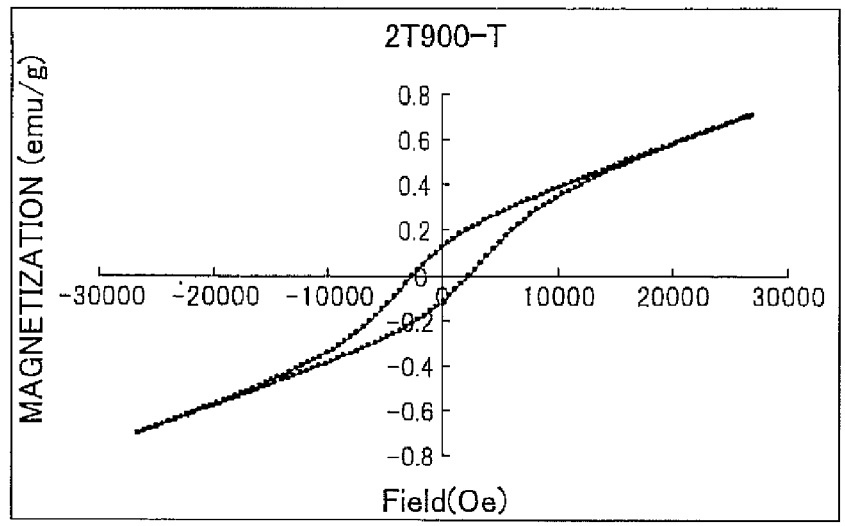
FIG. 18 shows magnetic properties as determined by VSM of an oriented hematite sintered body of Example 4 sintered at 900° C. after molding at a magnetic field strength of 2 T.
Figure 18B:
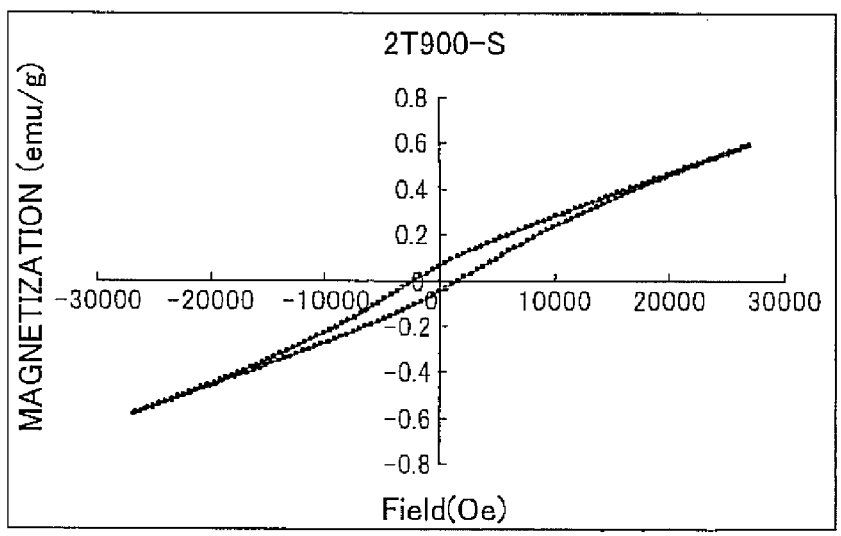

The following provides a description of Example 4. A homogeneous goethite molded article was obtained by pouring the above-mentioned slurry into a cylinder and slip casting in a magnetic field in the same manner as Example 1 with the exception of changing the magnetic field strength from 6 T to 2 T. A photograph of an example of this oriented goethite molded article slip cast in a magnetic field is shown in FIG. 4. An oriented hematite sintered body was obtained by sintering for 2 hours at 900° C. in the same manner as Example 1 with the exception of using this oriented goethite molded article. The results of VSM for the resulting oriented hematite sintered body are shown in FIG. 18. On the basis of FIG. 18, since the anisotropic factor (AF) of the shape of the opening is the width (W) of the opening, when the degree of anisotropy of magnetic characteristics as previously described is determined from the following formula, a value of about 1.5 results, and the result of visual observation of anisotropy in FIG. 20 was confirmed numerically as well. Degree of anisotropy=width (W) of opening in direction of axis of easy magnetization/width (W) of opening in direction of axis of hard magnetization=approx. 7 mm/approx. 4.6 mm=approx. 1.5.

Figure 19A:
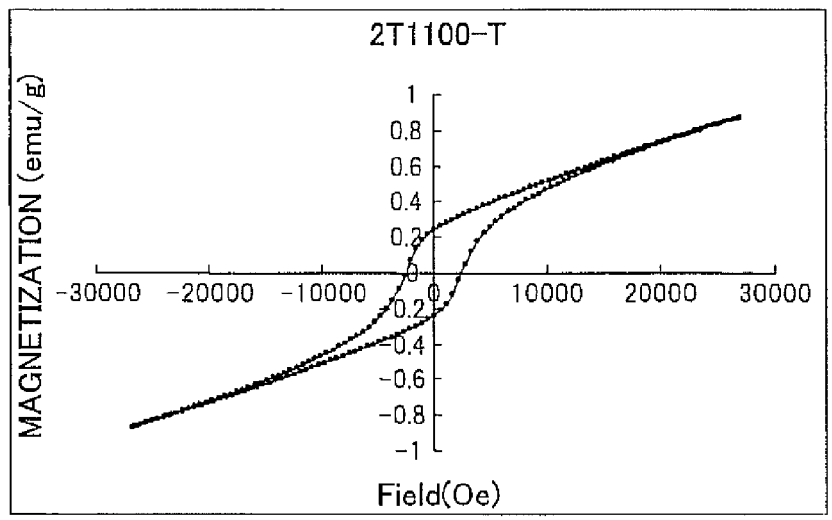
FIG. 19 shows magnetic properties as determined by VSM of an oriented hematite sintered body of Example 5 sintered at 1100° C. after molding at a magnetic field strength of 2 T.
Figure 19B:
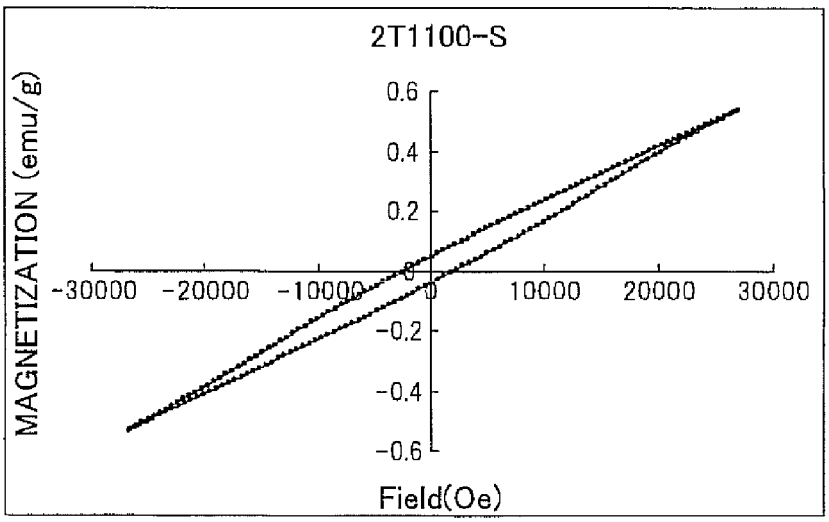

The following provides a description of Example 5. An oriented goethite molded article was obtained in the same manner as Example 1 with the exception of changing the magnetic field strength from 6 T to 2 T. An oriented hematite sintered body was obtained by sintering for 2 hours at 1100° C. in the same manner as Example 2 with the exception of using this oriented goethite molded article. The results of VSM for the resulting oriented hematite sintered body are shown in FIG. 19. On the basis of FIG. 19, since the anisotropic factor (AF) of the shape of the opening is the width (W) of the opening, when the degree of anisotropy of magnetic characteristics as previously described is determined from the following formula, a value of about 2.3 results, and the result of visual observation of anisotropy in FIG. 19 was confirmed numerically as well. Degree of anisotropy=width (W) of opening in direction of axis of easy magnetization/width (W) of opening in direction of axis of hard magnetization=approx. 9 mm/approx. 4 mm=approx. 2.3.

Figure 20A:
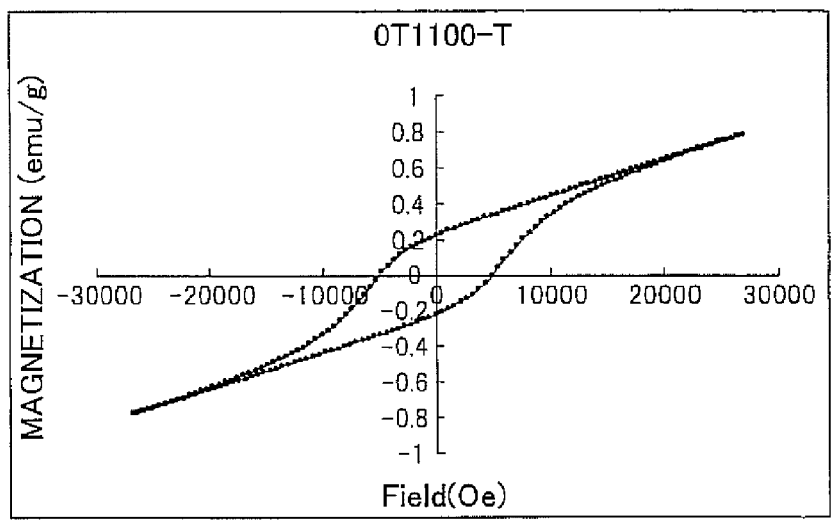
FIG. 20 shows magnetic properties as determined by VSM of a hematite sintered body of Comparative Example 2 sintered at 1100° C. after molding in the absence of a magnetic field.
Figure 20B:
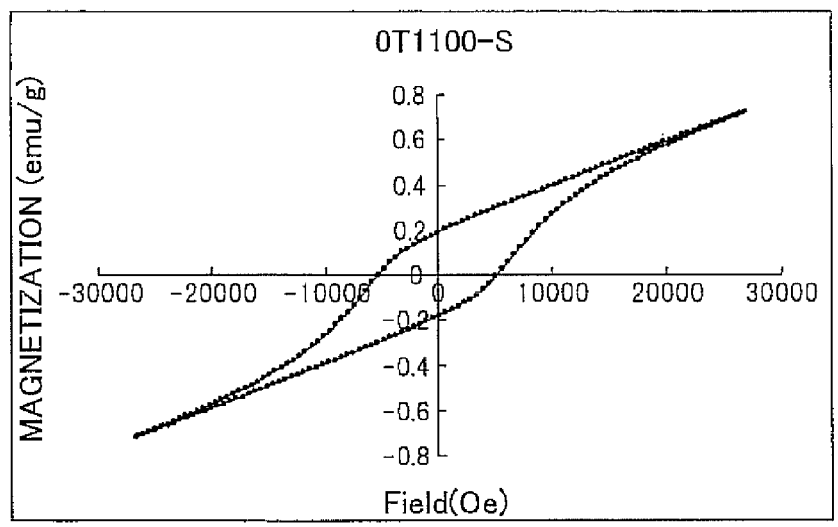

In Comparative Example 2, a goethite molded article was obtained in the same manner as Example 1 with the exception of not applying a magnetic field (indicated with 0 T in the drawings). A hematite sintered body was obtained by sintering for 2 hours at 1100° C. in the same manner as Example 5 with the exception of using this goethite molded article. The results of VSM for the resulting hematite sintered body are shown in FIG. 20. On the basis of FIG. 20, since the anisotropic factor (AF) of the shape of the opening is the width (W) of the opening, when the degree of anisotropy of magnetic characteristics as previously described is determined from the following formula, a value of about 1.0 results, and the result of visual observation of anisotropy in FIG. 20 was confirmed numerically as well. Degree of anisotropy=width (W) of opening in direction of axis of easy magnetization/width (W) of opening in direction of axis of hard magnetization=approx. 14 mm/approx. 14 mm=approx. 1.0.

Figure 21A:
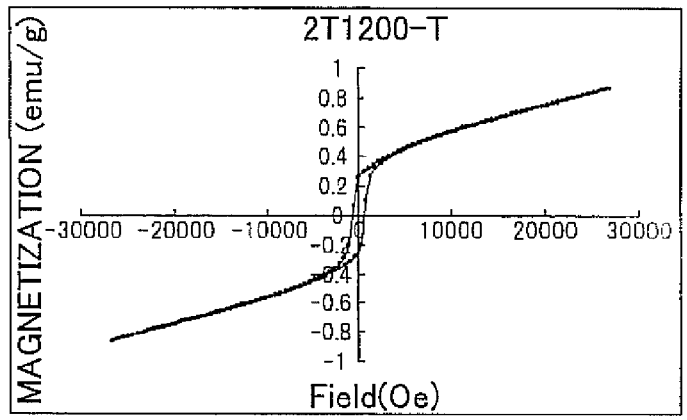
FIG. 21 shows magnetic properties as determined by VSM of an oriented hematite sintered body of Example 6 sintered at 1200° C. after molding at a magnetic field strength of 2 T.
Figure 21B:
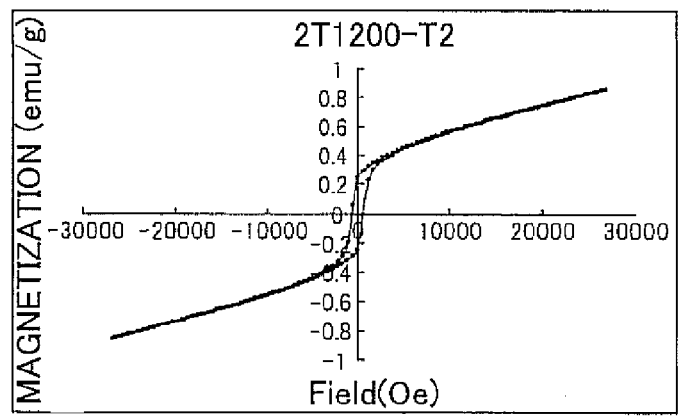
Figure 21C:
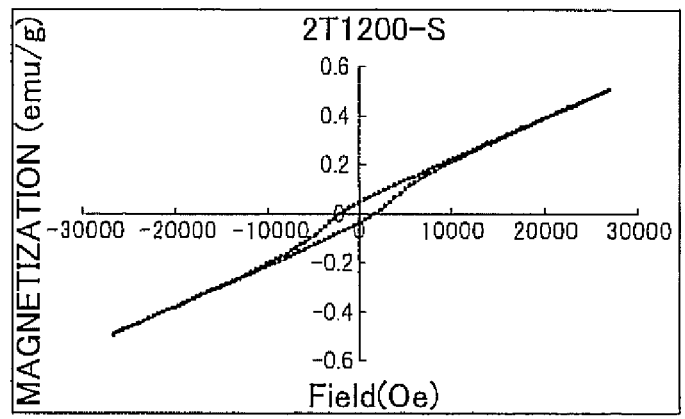

The following provides a description of Example 6. An oriented goethite molded article was obtained in the same manner as Example 1 with the exception of changing the magnetic field strength from 6 T to 2 T. An oriented hematite sintered body was obtained by sintering for 2 hours at 1200° C. in the same manner as Example 3 with the exception of using this oriented goethite molded article. The results of VSM for the resulting oriented hematite sintered body are shown in FIG. 21. On the basis of FIG. 21, since the anisotropic factor (AF) of the shape of the opening is the tan [angle (A) of the opening], when the degree of anisotropy of the magnetic characteristics as previously described is determined from the following formula, a value of about 4.8 results, and the result of visual observation of anisotropy in FIG. 21 was confirmed numerically as well. Degree of anisotropy=tan [angle (A) of opening in direction of axis of easy magnetization]/tan [angle (A) of opening in direction of axis of hard magnetization]=tan approx. 81°/tan approx. 280°=approx. 4.8.

In Comparative Example 3, a goethite molded article was obtained in the same manner as Example 1 with the exception of not applying a magnetic field (indicated with 0 T in the drawings). A hematite sintered body was obtained by sintering for 2 hours at 1200° C. in the same manner as Example 6 with the exception of using this goethite molded article. The results of VSM for the resulting hematite sintered body are shown in FIG. 22. On the basis of FIG. 22, since the anisotropic factor (AF) of the shape of the opening is the width (W) of the opening, when the degree of anisotropy of magnetic characteristics as previously described is determined from the following formula, a value of about 1.0 results, and the result of visual observation of anisotropy in FIG. 22 was confirmed numerically as well. Degree of anisotropy=width (W) of opening in direction of axis of easy magnetization/width (W) of opening in direction of axis of hard magnetization=approx. 4 mm/approx. 4 mm=approx. 1.0.

Figure 14:
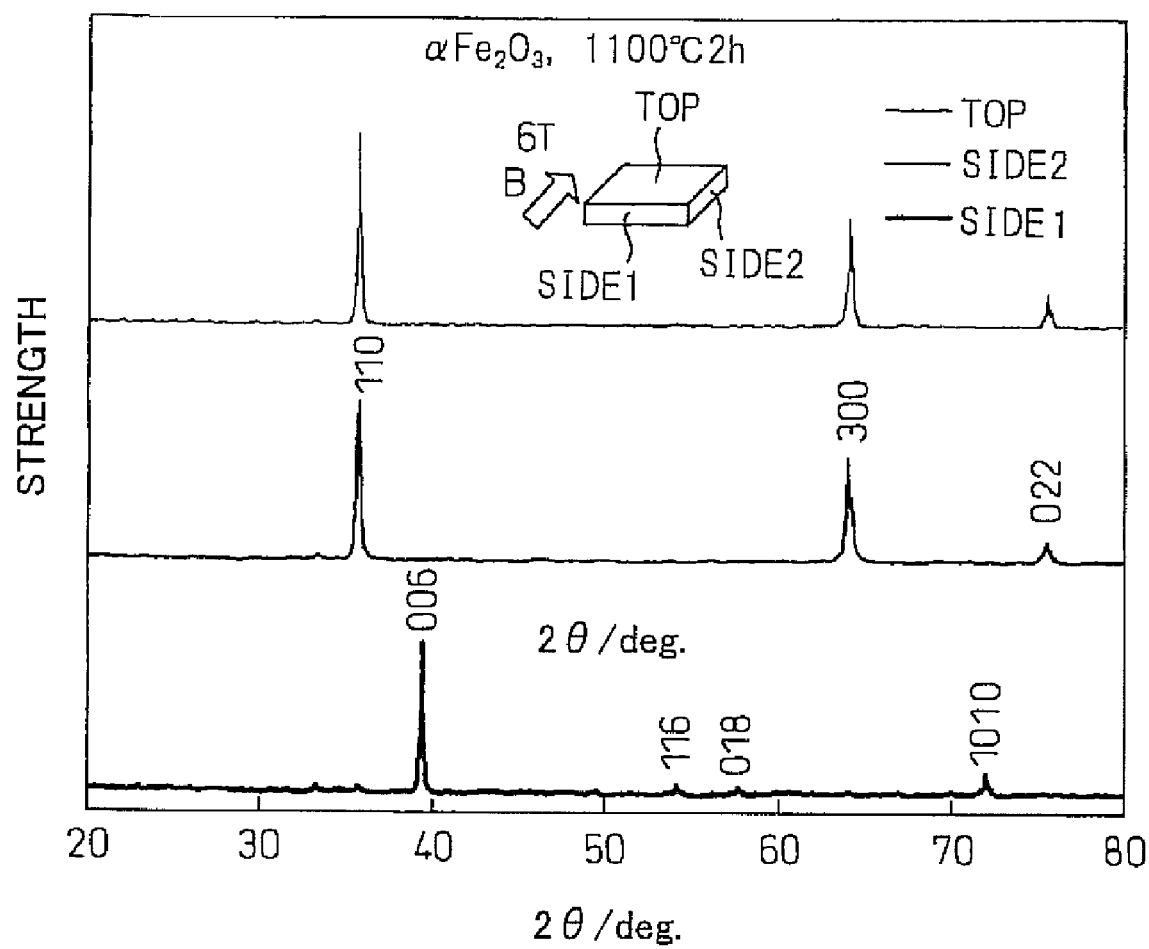
FIG. 14 is an XRD graph of an oriented hematite molded article of Example 8 in which an oriented goethite molded article, slip cast in a magnetic field in which the direction of the magnetic field is parallel to the ground, was sintered at 1100° C.

The following provides a description of Example 7. An oriented goethite molded article was obtained by carrying the same procedure as Example 2 with the exception of changing the direction of the magnetic field from the vertical direction (direction parallel to the earth's gravity) to the horizontal direction (direction parallel to the ground). An oriented hematite sintered body was obtained by sintering for 2 hours at 1100° C. in the same manner as Example 2 with the exception of using this oriented goethite molded article. The results of XRD of the resulting oriented hematite sintered body are shown in FIG. 14. As shown in FIG. 14, anisotropy was clearly confirmed between the top surface and side surface (SIDE 2) parallel to the direction of the magnetic field and the side surface (SIDE 1) perpendicular to the direction of the magnetic field.

In addition, the results of summarizing magnetic characteristics in the form of Hci (coercive force), Mr (residual magnetization) and Ms (saturation magnetization) of each of the top and side of the molded articles at each sintering temperature (900° C., 1100° C. or 1200° C.) for the results of measuring VSM in Examples 1 to 6 and Comparative Examples 1 to 3 are shown in the following Tables 1 to 3.

TABLE 1

| 900 (Top Surface) | | | | 900 (Side Surface) | | | |
|---|---|---|---|---|---|---|---|
| B (T) | Hci (Oe) | Mr (memu/g) | Ms (memu-g) | B (T) | Hci (Oe) | Mr (memu/g) | Ms (memu/g) |
| 0 | 2934.5 | 109.25 | 535.49 | 0 | | | |
| 2 | 2525.4 | 122.89 | 709.72 | 2 | 2098.7 | 59.609 | 589.86 |
| 6 | 2120.4 | 89.989 | 582.68 | 6 | 1751.6 | 43.479 | 503.45 |

TABLE 2

| 1100 (Top Surface) | | | | 1100 (Side Surface) | | | |
|---|---|---|---|---|---|---|---|
| B (T) | Hci (Oe) | Mr (memu/g) | Ms (memu-g) | B (T) | Hci (Oe) | Mr (memu/g) | Ms (memu/g) |
| 0 | 4970.9 | 220.73 | 781.54 | 0 | 5255 | 187.31 | 722.91 |
| 2 | 2518.8 | 240.088 | 871.99 | 2 | 2288.9 | 46.432 | 538.08 |
| 6 | 3511.9 | 221.01 | 832.47 | 6 | 2607.6 | 49.866 | 541.78 |

TABLE 3

| 1200 (Top Surface) | | | | 1200 (Side Surface) | | | |
|---|---|---|---|---|---|---|---|
| B (T) | Hci (Oe) | Mr (memu/g) | Ms (memu-g) | B (T) | Hci (Oe) | Mr (memu/g) | Ms (memu/g) |
| 0 | 1139.6 | 206.62 | 766.26 | 0 | 1214.1 | 188.64 | 724.41 |
| 2 | 615.02 | 241.53 | 863.84 | 2 | 1933.3 | 42.372 | 501.35 |
| 6 | 620.29 | 229.19 | 903.46 | 6 | 912.84 | 18.482 | 518.38 |

Figure 6A:
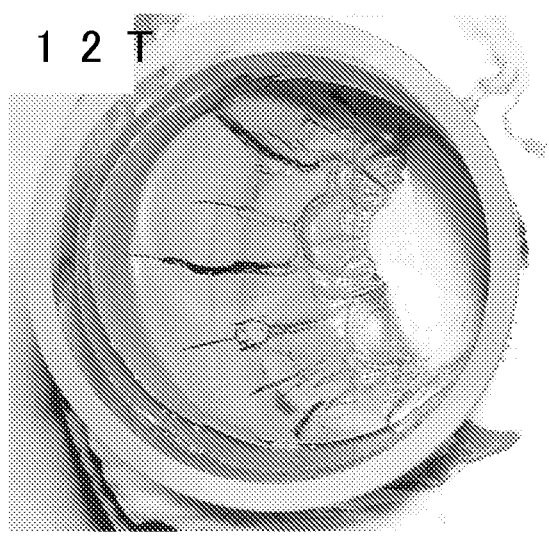
FIG. 6 is a photograph of a goethite molded article solidified in a magnetic field in the case of having changed magnetic field strength in an example of the invention.
Figure 6B:
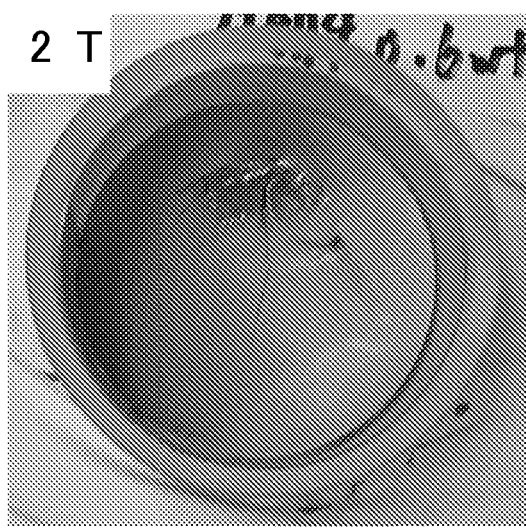

In Comparative Example 4, a goethite molded article was obtained in the same manner as Example 1 with the exception of changing the magnetic field strength from 6 T to 12 T. A photograph of the goethite molded article in a container is shown in FIG. 6 along with that of Example 4 (the photograph on the left in FIG. 6 shows the heterogeneous goethite molded article of Comparative Example 4 in the case of a magnetic field strength of 12 T, while the photograph on the right shows he homogeneous goethite molded article of Example 4 in the case of a magnetic field strength of 2 T). In this manner, in the case of slip casting at a magnetic field strength of 12 T, it is difficult to obtain a homogeneous goethite molded article due to the magnetic field strength being excessively strong. It was also separately confirmed that even if the magnetic field strength is 10 T, the magnetic field strength is similarly excessively strong, thereby preventing the obtaining of a homogeneous goethite molded article.

Figure 23A:
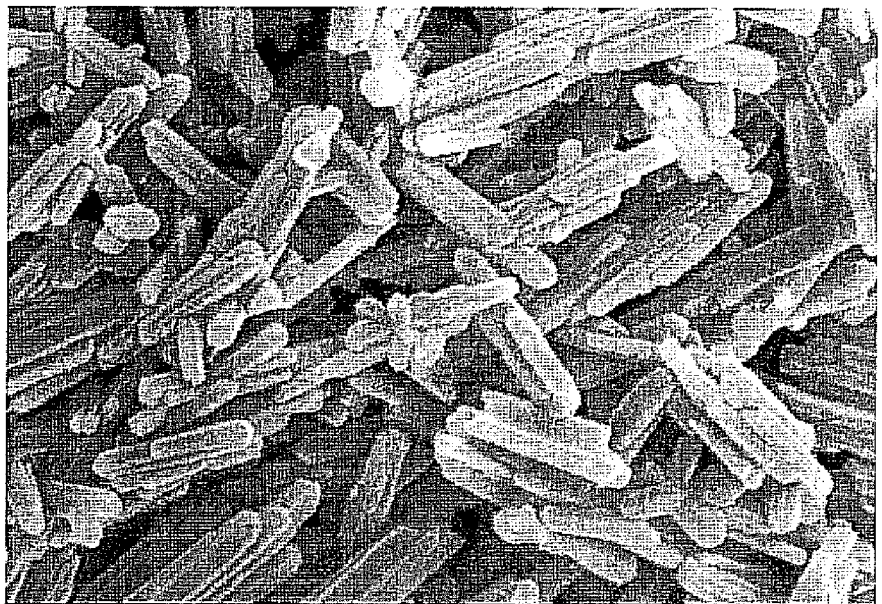
FIG. 23 is an scanning electron micrograph (SEM) micrograph of one example of an oriented goethite obtained in an example.
Figure 23B:
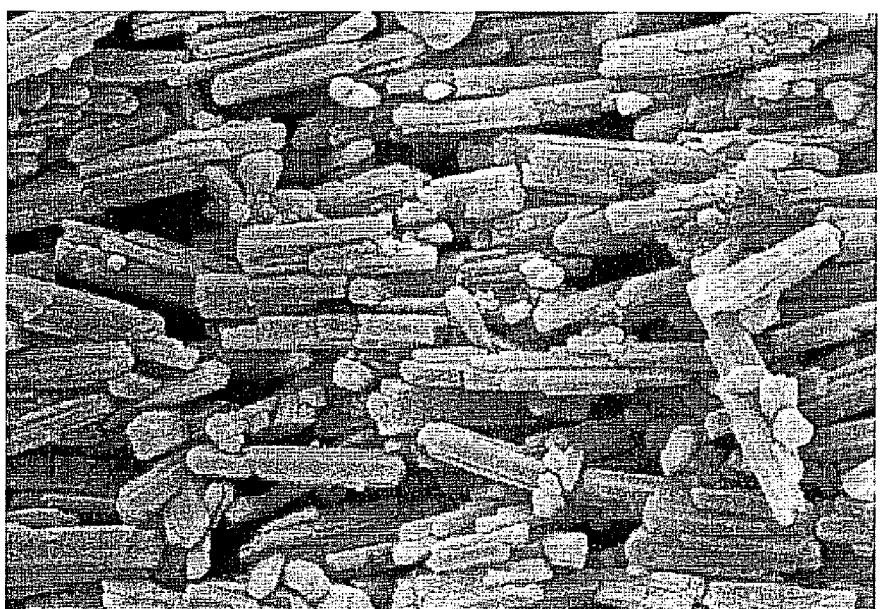

SEM micrographs of oriented goethite molded articles following solidification and molding in a magnetic field as obtained in Examples 1 to 6 are shown in FIG. 23, while an SEM micrograph of one example of an oriented hematite sintered body is shown in FIG. 24. As is clear from these micrographs, the oriented sintered bodies obtained in these examples are such that the T surface (TOP surface) demonstrates an isometric structure, while the S surface (SIDE surface) demonstrates a horizontally long structure, and in these examples, the hematite following sintering has a sheet-like structure.

Feebly magnetism in the invention refers to feebly magnetism in the case interaction between electron spin responsible for magnetism is weak and there is no spontaneous orientation of spin, and is used as a term to contrast ferromagnetism. More specifically, this refers to paramagnetism or diamagnetism.

Anisotropy in an anisotropic magnetic material in the invention may refer to that in which the degree of anisotropy as determined from a curve in the direction of the axis of easy magnetization and the curve in the direction of the axis of hard magnetization in MH curves determined by measurement with VSM, which indicates the magnetic characteristics of a molded article to be described later, is 1.2 or more.

In addition, a topotactic (transformation) reaction in the invention refers to a reaction that causes a change in a reaction product (substance desired to be obtained after the reaction) while maintaining the form (such as the orientation of particles) of the starting material. This topotactic (transformation) reaction may be used to impart orientation to ceramics are conventional.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A process for producing an anisotropic magnetic material, comprising:
    preparing a feebly magnetic material capable of transforming into a magnetic substance by a topotactic reaction;
    orienting the feebly magnetic material by imparting an external field to the feebly magnetic material; and
    transforming the oriented feebly magnetic material to the magnetic substance by the topotactic reaction, wherein the magnetic substance is a ferromagnetic material having a greater magnetic strength than the feebly magnetic material.

2. The production process according to claim 1, wherein the material in an oriented state or the magnetic substance is molded into a bulk molded article.

3. The production process according to claim 1, wherein the feebly magnetic material is $\alpha$-FeOOH, and the magnetic substance is $\alpha$-Fe$_2$O$_3$.

4. The production process according to claim 1, wherein the feebly magnetic material is a diamagnetic substance or a paramagnetic substance, and the magnetic substance to which the feebly magnetic material transforms is a ferromagnetic material.

5. The production process according to claim 1, wherein the imparting of the external field is the application of a magnetic field.

6. The production process according to claim 5, wherein the strength of the magnetic field is greater than or equal to 1 T and less than 10 T.

7. The production process according to claim 6, wherein the strength of the magnetic field is 1.5 T to 8 T.

8. The production process according to claim 3, wherein the imparting of an external field is the application of a magnetic field, and the strength of the magnetic field is greater than or equal to 1 T and less than 7 T.

9. The production process according to claim 8, wherein the strength of the magnetic field is 1.5 T to 6.5 T, inclusive.

10. The production process according to claim 5, wherein the direction in which the magnetic field is applied is vertical.

11. The production process according to claim 3, wherein the topotactic reaction is a dehydration reaction of the feebly magnetic material.

12. The production process according to claim 11, wherein the dehydration reaction is a dehydration reaction carried out by heating the feebly magnetic material, and the temperature of the heated feebly magnetic material is 250° C. or higher.

13. The production process according to claim 12, wherein the temperature of the heated feebly magnetic material is equal to or greater than 900 and equal to or less than 1500° C.

14. The production process according to claim 11, wherein the temperature of the heated feebly magnetic material is equal to or greater than 1100 and equal to or less than 1200° C.

15. The production process according to claim 1, wherein the feebly magnetic material is $\gamma$-FeOOH, and the magnetic material is $\gamma$-Fe$_2$O$_3$.

16. The production process according to claim 1, wherein the feebly magnetic material is Co(OH)$_3$.

17. The production process according to claim 1, wherein the magnetic substance includes iron oxides, cobalt oxides, or ferrites combining at least one of MnO, ZnO, NiO, MgO, CuO or Li$_2$O with iron oxides.

18. The production process according to claim 17, wherein the feebly magnetic material includes FeOOH, Fe(OH)$_3$, Co(OH)$_2$,
    FeOOH and materials adding at least one hydroxide of Mn, Zn, Ni, Mg, Cu or Li to the FeOOH or materials adding at least one hydroxycarbonate of Mn, Zn, Ni, Mg, Cu or Li to the FeOOH, or Fe(OH)$_3$ and materials adding at least one hydroxide of Mn, Zn, Ni, Mg, Cu or Li to the Fe(OH)$_3$ or materials adding at least one hydroxycarbonate of Mn, Zn, Ni, Mg, Cu or Li to the Fe(OH)$_3$.

* * * * *

UNITED STATES PATENT AND TRADEMARK OFFICE
CERTIFICATE OF CORRECTION

| | |
|---|---|
| PATENT NO. | : 8,092,777 B2 |
| APPLICATION NO. | : 12/365401 |
| DATED | : January 10, 2012 |
| INVENTOR(S) | : Naoki Nakamura et al. |

It is certified that error appears in the above-identified patent and that said Letters Patent is hereby corrected as shown below:

Col. 16 line 41 in claim 15: replace second occurrence of "material" with --substance--.

Signed and Sealed this
Twenty-eighth Day of February, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,092,777 B2 | Page 1 of 1 |
| APPLICATION NO. | : 12/365401 | |
| DATED | : January 10, 2012 | |
| INVENTOR(S) | : Naoki Nakamura et al. | |

It is certified that error appears in the above-identified patent and that said Letters Patent is hereby corrected as shown below:

At column 13, line number 52 delete "280" and insert --28°--.

Signed and Sealed this
Nineteenth Day of February, 2013

Teresa Stanek Rea
*Acting Director of the United States Patent and Trademark Office*